US010182102B1

(12) United States Patent
Miller

(10) Patent No.: US 10,182,102 B1
(45) Date of Patent: Jan. 15, 2019

(54) METHODS, SYSTEMS, AND ARTICLES OF MANUFACTURE FOR CONFIGURATION-BASED CLIENT-SIDE FLOW CONTROL FRAMEWORK FOR CUSTOMIZABLE USER EXPERIENCE

(71) Applicant: Intuit Inc., Mountain View, CA (US)

(72) Inventor: Gregory W. Miller, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 713 days.

(21) Appl. No.: 14/105,005

(22) Filed: Dec. 12, 2013

(51) Int. Cl.
*G06F 15/16* (2006.01)
*H04L 29/08* (2006.01)

(52) U.S. Cl.
CPC .................... *H04L 67/10* (2013.01)

(58) Field of Classification Search
CPC   H04L 29/08072; H04L 29/06; H04L 29/0809
USPC ........................................................ 709/203
See application file for complete search history.

(56) References Cited

U.S. PATENT DOCUMENTS

| | | | |
|---|---|---|---|
| 7,428,546 B2 | 9/2008 | Nori et al. | |
| 7,747,484 B2 | 6/2010 | Stanley et al. | |
| 7,860,763 B1 | 12/2010 | Quinn et al. | |
| 8,204,805 B2 | 6/2012 | Eftekhari et al. | |
| 8,335,982 B1 * | 12/2012 | Colton ................. | G06F 9/44521 715/234 |
| 8,527,860 B1 * | 9/2013 | Colton .............. | G06F 17/30893 709/203 |
| 8,719,451 B1 * | 5/2014 | Colton ................. | G06F 17/3089 709/248 |
| 8,806,431 B1 * | 8/2014 | Colton .................... | G06F 8/316 717/114 |
| 2003/0078949 A1 | 4/2003 | Scholz et al. | |
| 2004/0153536 A1 | 8/2004 | Strassner | |
| 2004/0205179 A1 | 10/2004 | Hunt et al. | |
| 2007/0130138 A1 * | 6/2007 | van Wyk ............... | G06Q 10/06 |
| 2007/0180386 A1 * | 8/2007 | Ballard ............. | G06F 17/30905 715/744 |
| 2007/0208777 A1 * | 9/2007 | van Wyk ............... | G06Q 10/06 |
| 2007/0294669 A1 * | 12/2007 | Robalewski ........ | G06F 9/44505 717/120 |
| 2008/0046462 A1 | 2/2008 | Kaufman et al. | |
| 2008/0120129 A1 | 5/2008 | Seubert et al. | |

(Continued)

OTHER PUBLICATIONS http://en.wikipedia.org/wiki/JavaScript, printed Dec. 12, 2013 (24 pages).

(Continued)

*Primary Examiner* — Vivek Srivastava
*Assistant Examiner* — Atta Khan
(74) *Attorney, Agent, or Firm* — DLA Piper LLP US

(57) ABSTRACT

A method and a system for implementing a configuration-based client-side flow control framework obtain and execute a script from a server to initialize the client-side framework on the client computer. The framework receives references to resources for the flow and references a flow configuration file on the server to identify the actual locations of the resources on the server. The framework then retrieves the actual implementation of the resources from the server and uses the actual implementations in reproducing views presented to the browser screen to represent navigation experience that the developer of a website to which users attempt to access desires the user to experience.

25 Claims, 11 Drawing Sheets

(56) References Cited

U.S. PATENT DOCUMENTS

| | | | |
|---|---|---|---|
| 2008/0294418 A1 | 11/2008 | Cleary et al. | |
| 2010/0070394 A1* | 3/2010 | Wyle | G06F 17/243 705/31 |
| 2010/0251092 A1* | 9/2010 | Sun | G06F 17/243 715/222 |
| 2011/0209049 A1 | 8/2011 | Ghosh et al. | |
| 2012/0109792 A1* | 5/2012 | Eftekhari | G06F 21/31 705/31 |
| 2013/0080516 A1* | 3/2013 | Bologh | H04N 21/26216 709/203 |
| 2013/0139096 A1* | 5/2013 | Rist | G06F 9/451 715/781 |
| 2013/0218735 A1* | 8/2013 | Murray | G06Q 40/123 705/31 |
| 2013/0275511 A1* | 10/2013 | Wilson | G06N 3/02 709/204 |
| 2014/0289738 A1* | 9/2014 | Paliwal | G06F 8/38 719/311 |
| 2015/0026246 A1* | 1/2015 | Taylor | G06Q 10/06 709/203 |

OTHER PUBLICATIONS www.turbotax.com, printed Dec. 12, 2013 (6 pages).
www.quicken.com, printed Dec. 12, 2013 (6 pages).
http://en.wikipedia.org/wiki/A/B_testing, printed Dec. 12, 2013 (3 pages).
http://www.pcworld.com/article/250132/tax_sites_turbotax_is_still_the_one_to_beat.html, printed Dec. 12, 2013 (9 pages).
Non-Final Office Action dated Dec. 4, 2015 in U.S. Appl. No. 14/104,911, filed Dec. 12, 2013, Inventor: Gregory W. Miller, (28pages).
Amendment and Response dated Mar. 4, 2016 in U.S. Appl. No. 14/104,911, filed Dec. 12, 2013, Inventor: Gregory W. Miller, (37pages).

\* cited by examiner

| Application Global Options | | |
|---|---|---|
| appId | setFocusOnFirstInput | attributeBindingList |
| defaultViewport | showTransitionMsg | dontBindTextInNodeList |
| ABTestConfig | transitionMsg | visibilityFunction |
| viewResolverOptions | defaultModelClass | disabledFunction |
| flowResolverOptions | autoCreateModels | alertOnMojoExceptions |
| actionResolverOptions | defaultTextForNullModelValue | formatOptions |
| modelDefOptions | dataBindEvent | enableTraceConsole |
| validationOptions | | |

FIG. 8

METHODS, SYSTEMS, AND ARTICLES OF MANUFACTURE FOR CONFIGURATION-BASED CLIENT-SIDE FLOW CONTROL FRAMEWORK FOR CUSTOMIZABLE USER EXPERIENCE

CROSS REFERENCE TO RELATED APPLICATIONS

This U.S. patent application is related to U.S. application Ser. No. 14/104,859, entitled "METHODS, SYSTEMS, AND ARTICLES OF MANUFACTURE FOR CONFIGURATION-BASED CLIENT-SIDE RESOURCE RESOLUTION FRAMEWORK FOR CUSTOMIZABLE USER EXPERIENCE" and filed concurrently on Dec. 12, 2013, and U.S. application Ser. No. 14/104,911, entitled "METHODS. SYSTEMS, AND ARTICLES OF MANUFACTURE FOR IMPLEMENTING MODEL DEFINITION AND CONSTRAINT ENFORCEMENT AND VALIDATION" and filed concurrently on Dec. 12, 20132. The contents of both of the above-identified U.S. applications filed concurrently on Dec. 12, 2013 are hereby explicitly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Web developer or a programmer may oftentimes need to define what user experiences in navigating through the developer's website in a configurable manner without using or knowing any server side programming or server side frameworks. For example, a Web developer or a programmer may desire to compose screens users may see in common markup languages (e.g., HTML, XML, etc.), specify branching logic or business logic in navigation for the website, or provide custom functionalities for guiding users through their browsing sessions in a dynamic way, without having to use or even know any server-side technologies such as server-side scripting languages such as ASP (Active Server Pages). Python, JavaServer Pages (JSP), Perl, etc.

SUMMARY

Disclosed are various embodiments relating to methods, systems, and articles of manufacture for a configuration-based client-side flow control framework for customizable user experience. Some embodiments are directed at one or more methods for a configuration-based client-side flow control framework for customizable user experience. The method may first receive a request from a user at a client computing device to access a main webpage of a developer's website hosted on a remote computer (e.g., a Web server) and then identify one or more script files for the main webpage. The one or more script files may include one or more JAVASCRIPT computer programs or files and may be transmitted to the client computer. JAVASCRIPT is a registered trademark of Oracle America Inc., Redwood Shores, Calif. For example, the Web server hosting the developer's website may transmit the one or more JAVASCRIPT files to the browser memory of the Web browser on the client computer.

The remote computer may further host one or more configuration files either on the remote computer or in a storage medium operatively coupled to the remote computer. Once receiving the one or more script files from the remote computer, the client computer may execute at least one of these one or more script files locally on the client computer to set up the client-side framework. The client-side framework reads the one or more configuration files stored on the remote computer to identify references from one or more webpages for the website to various resources (e.g., one or more views to be presented, one or more flows or sub-flows for navigation, one or more actions to be performed, etc.) needed for reproducing views for presentation to the user in the browser. The client-side framework on the client computer further use one or more controllers and one or more resolvers to resolve the references from those one or more webpages to identify the locations and retrieve the actual implementations of the needed various resources from the remote computer such that the client-side framework may reproduce the appropriate views for presentation in the browser on the client computer.

For example, the client-side framework may use an action controller and an action resolver to identify the location of an action to be performed and to retrieve or obtain the actual implementation (e.g., the actual code of a function or a script, etc.) from the web server to send the actual implementation to the action controller in the client-side framework to properly execute the actual implementation of the action for determining the decision logic to properly guide the user through the navigation sequence that the user will be experiencing. For example, the client-side framework may use a view controller and a view resolver to identify the location(s) of webpage content and to retrieve or obtain the actual implementation (e.g., the actual code of the webpage content, etc.) from the web server to send the actual implementation to the view controller in the client-side framework to properly embed the actual implementation of the webpage content in the view and to render the view to be presented to the user. For example, the client-side framework may use a flow controller and a flow resolver to identify the location of a sequence of one or more screens to be presented and to retrieve or obtain the actual implementation (e.g., the actual code of the branching logic, the flow, or a sub-flow, etc.) from the web server to send the actual implementation to the flow controller in the client-side framework to properly guide the user through the customizable navigation sequence that the user will be experiencing.

Some embodiments are directed at an apparatus for implementing various processes described herein. More details about the apparatus for implementing various processes will be described in some of the subsequent paragraphs with reference to one or more drawing figures.

Some embodiments are directed at an article of manufacture having stored thereupon a sequence of instructions which, when executed by a mobile communication device, causes the mobile communication device to perform various processes or to invoke various modules described herein. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 8 illustrates some illustrative application global options in some embodiments.

Figure 1:
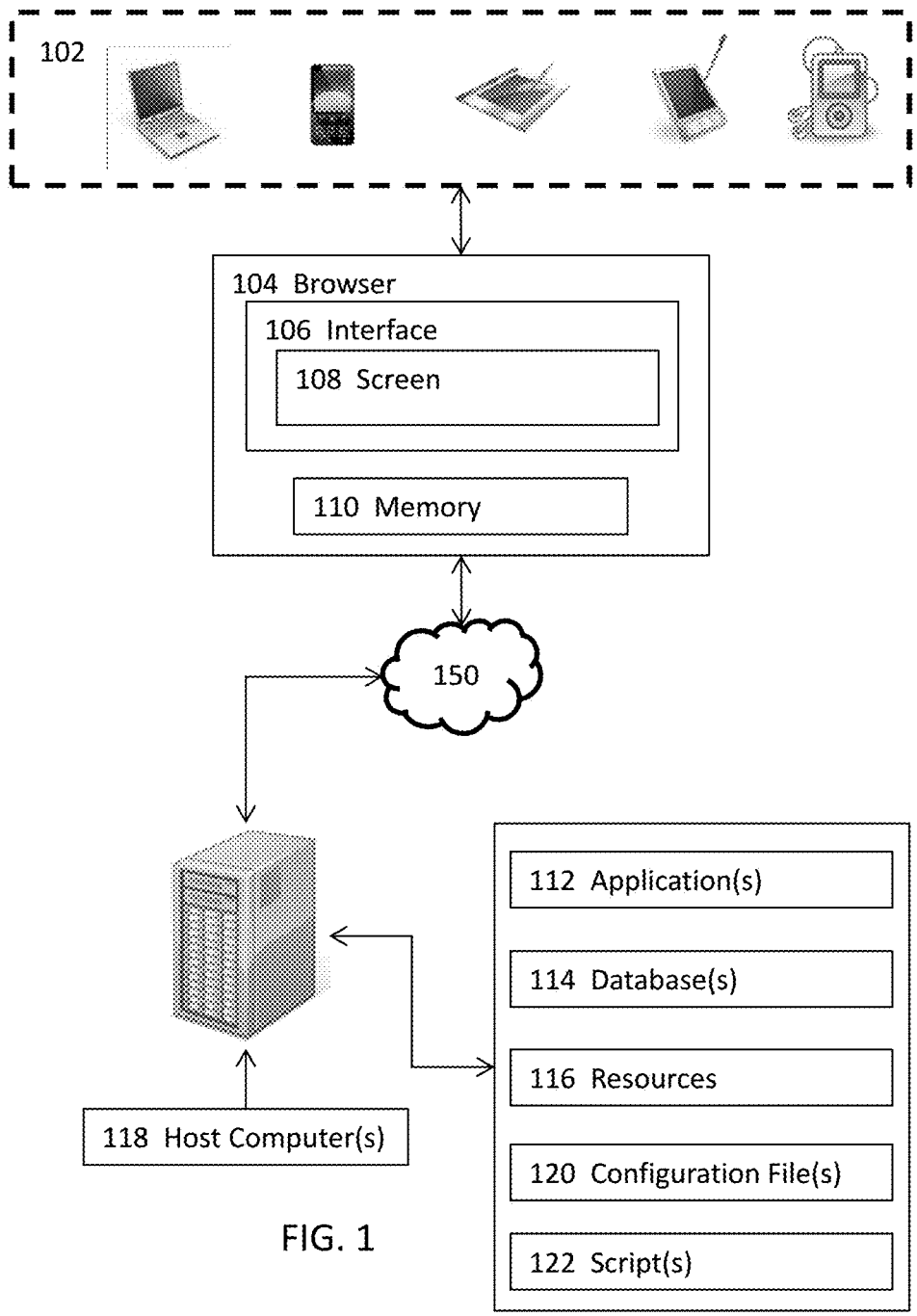
FIG. 1 illustrates a high level schematic diagram of a configuration-based client-side flow control framework for customizable user experience in some embodiments.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments.

DETAILED DESCRIPTION OF ILLUSTRATED EMBODIMENTS

Disclosed are a method, system, and article of manufacture for implementing a configuration-based client-side flow control framework for delivering customizable user experience in navigating through a sequence of pages of a website for a web-hosted application hosted on a remote host computer. Upon the user's access the main webpage of a website, the client computing device receives one or more script files (e.g., one or more JAVASCRIPT files) from the remote host computer when a user uses, for example, a browser on the client computing device to access the website hosted on the remote host server. The client computing device executes the one or more script files to initialize a client-side framework on the client computing device for navigating through a sequence of webpages that the developer of the website desires the users to experience.

The main webpage of the website may include the code to start a first flow that the developer of the website customizes and desires users to experience during a period of time. The main webpage of the website may include the code to start a second flow that the developer of the website customizes and desires users to experience during another period of time. In other words, the developer may alter the users' experience in navigating the website by simply changing the flow that will be started when users visit, for example, the main webpage of a portion of the website. The same user may thus acquire different experience in browsing the same portion of the website at different times, if the developer alters the flow or flow configuration files between two user visits of the website.

The client-side framework resides on the client computing device and includes a flow controller that identifies a request for a reference to a flow definition object or file that includes definitions or configurations of elements of the flow. The client-side framework also includes a flow resolver to determine the action location of the flow definition object or file based at least in part on the reference. The flow resolver then obtains the actual implementation (e.g., the instance of the flow definition object or the code of the flow definition file) and returns the obtained actual implementation to the flow controller. The flow controller then accesses the flow definition object or file to identify or determine the proper sequence of screens as indicted by the flow that the developer desires users to experience.

FIG. 1 illustrates a high level schematic diagram of a configuration-based client-side flow control framework for customizable user experience in some embodiments. More specifically, FIG. 1 illustrates a client computing device 102 having installed thereupon a web browser 104 that utilizes, for example, LAN (local area network), WAN (wide area network), wireless networks, cellular services, or other similar services to operatively connect to a remotely located host computer 118 via the Internet 150. The browser 104 on the client computing device 102 may include a user interface having a screen 108 to display webpages to a user. The client computing device 102 may further allocate some non-transitory memory 110 for the web browser 104 or browser for simplicity such that the browser 104 may interactive with, retrieve, present, and traversing information resources on the World Wide Web by using the Uniform Resource Identifier (URI) or Uniform Resource Locator (URL) associated with the information resources such as one or more web pages, images, videos, or other pieces of content.

The remotely located host computer 118 such as a Web server to which the client computing device attempts to connect may either include thereupon or be operatively coupled with one or more applications 112, one or more database(s) 114, one or more resources 116, one or more configuration files 120, or one or more scripts 122. A resource may include an action, a view, or a flow in some embodiments. In these embodiments, a flow includes one or more sub-flows each including one or more flow nodes through which a user may traverse when interacting with a website. A flow node represents a flow state that defines the experience that a user will be going through. A flow node may be further associated with one or more functionalities including, for example, one or more input variables to pass information into a flow when the flow starts or one or more modal specifications to allow running an entire flow or a portion thereof in a modal window including a pop-up window. The "modal" attribute or option may be used interchangeably throughout this application and includes an object in order to make a flow or a portion thereof modal. The "modal" attribute or option may specify how the modal window behave when the modal window is closed.

The following pseudo-code represents an illustrated flow node specification.

```
<nodeName>: [
    history : <never | session > [optional]
    state_type : <VIEW | ACTION | FLOW | END>,
    ref: <string>, // reference to a VIEW, ACTION, or FLOW. References
are resolved using the configuration files.
    modal: { [optional ]
        closeButton : [Boolean] // supply a close button on the modal,
        navWhenDone : [Boolean]// allow the content of a modal window
navigate the flow controller
        blockCloseWhenErrors : [Boolean] // this option does not allow the
modal to close if error tool tips are showing //
    },
    inputVars : { [optional - for FLOW nodes only ] // this option is one
way to transmit information into a flow
        "varName" : varValue // may be a model value or a JAVASCRIPT
primitive
        etc...
    },
    transitions : {
        <on response> : <to node>,
        <on response> : <to node>,
        etc...
    }
}
```

Figure 2:
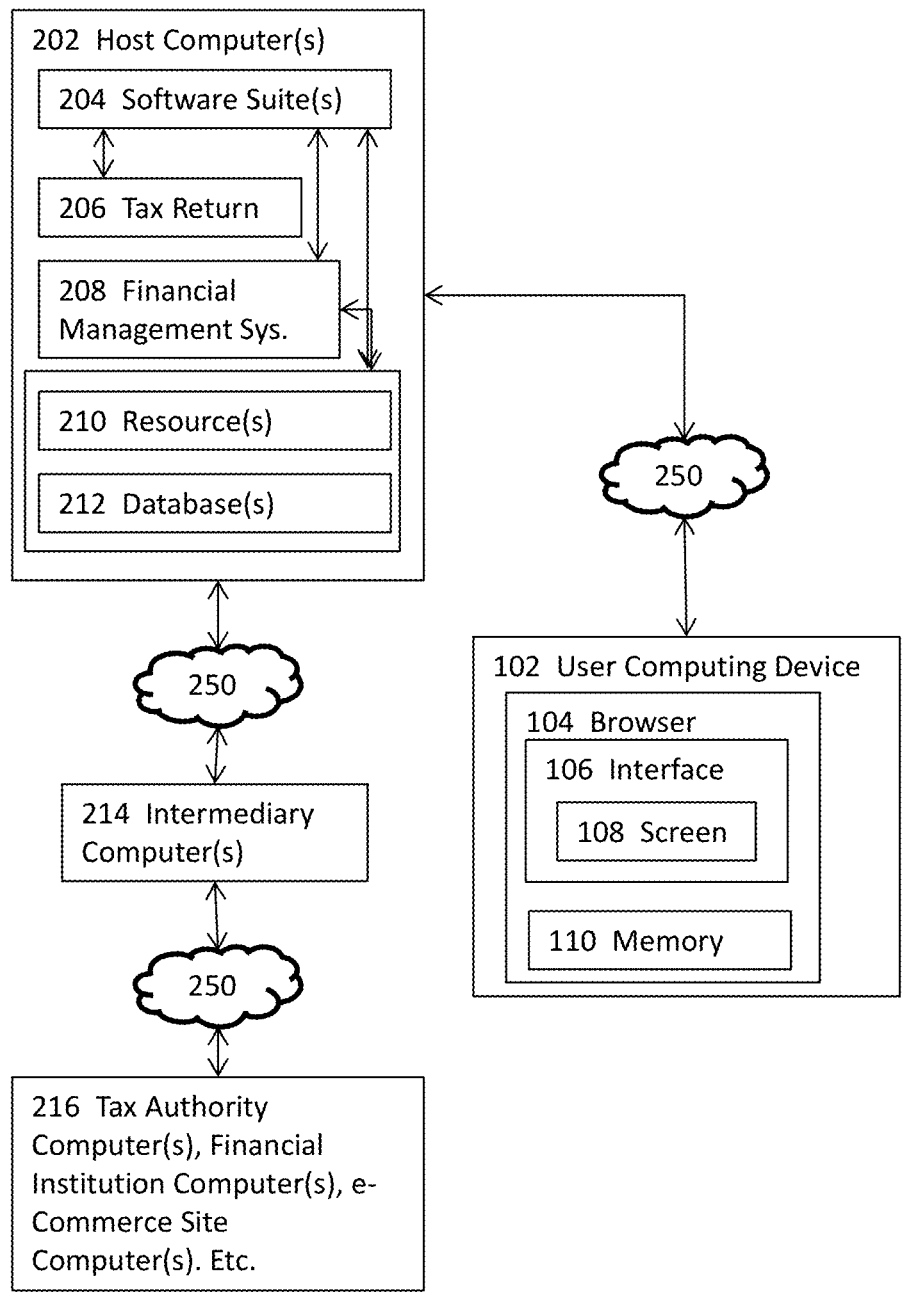
FIG. 2 illustrates another schematic diagram of a configuration-based client-side flow control framework for customizable user experience in some embodiments.

FIG. 2 illustrates another schematic diagram of a configuration-based client-side flow control framework for customizable user experience in some embodiments. More specifically, the illustrative schematic diagram shows a user computing device 102 including a browser 104 that further includes an interface 106 having a screen 108 and corresponds to some non-transitory memory 110. The client computing device 102 may be operatively connected to one or more host computers 202 via network 250 to access one or more software suites 204 (e.g., TURBO TAX tax return preparation application or software available from Intuit Inc.) that is used to, for example, prepare tax returns 206 or to access one or more financial management systems 208 (e.g., QUICKEN, QUICKEN On-Line, QUICKBOOKS, QUICKBOOKS On-Line, FINANCEWORKS, and MINT financial management systems or software available from Intuit Inc. for personal and/or corporate financial management, Microsoft Money® financial management system of Microsoft Corporation, and PAYCYCLE on-line human resources administrative services, now Intuit Online Payroll, available from Intuit Inc. QUICKEN, QUICKBOOKS, FINANCEWORKS, MINT and PAYCYCLE are registered trademarks of Intuit Inc., Mountain View, Calif., and MICROSOFT is a registered trademark of Microsoft Corporation, Redmond, Wash.

The one or more software suites 204 or the one or more financial management systems 208 may also be coupled with one or more resources 210 or one or more databases 212. The one or more host computers 202 may be operatively coupled to one or more intermediate computers 214 such as some intermediate servers which may be in turn coupled to one or more computers of a tax authority (e.g., Internal Revenue Service), of one or more financial institutions (e.g., banks, credit card issuing institutions, payment gateways, etc.), or of one or more e-commerce sites 216 via network 250.

Figure 3:
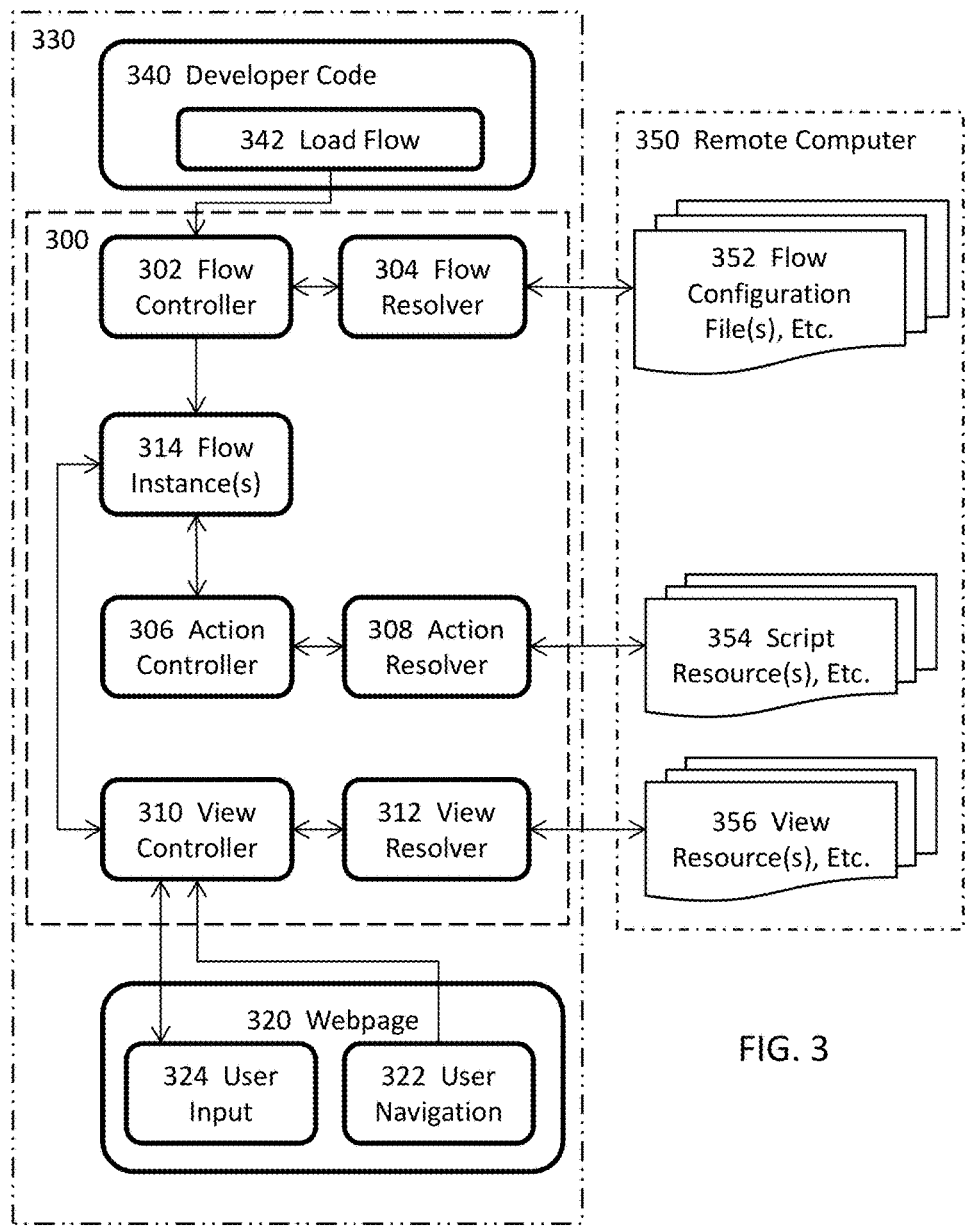
FIG. 3 illustrates a more detailed schematic flow diagram of a configuration-based client-side flow control framework for customizable user experience with additional controllers and resolvers in some embodiments.

FIG. 3 illustrates a more detailed schematic flow diagram of a configuration-based client-side flow control framework for customizable user experience with additional controllers and resolvers in some embodiments. More specifically, the more detailed schematic flow diagram includes a webpage 330 on a client computing device the webpage 330 having some developer code 340 to load a flow 342. In some embodiments, the developer code 340 may include code written in some scripting languages or code written in some simpler markup language. The webpage 330 further includes the client-side framework 300 that interacts with the portion of the webpage 320 (e.g., some data object model objects, etc.) visible to a user that may further includes one or more fields 324 for accepting and transmitting user input or some user initiated navigation information 322. The developer code may, upon receipt of a request from a user to access webpage (e.g., webpage 320), execute a segment 342 of the developer code 340 to load a flow as the developer desires to load. The client-side framework 300 may then execute one or more script (e.g., one or more JAVASCRIPT files) received from the remotely located computer (e.g., 118 of FIG. 1) when the user attempts to access the webpage via the client computing device (e.g., 102 of FIG. 1) to start the flow. By way of example, the flowing pseudo-code may be used to start a flow.

```
//*********************************************
**********
```

```
* Start up the flow controller and return the first view to the user
*
@params : flowName [string]
    args [object]
        modal [object]
        -closeButton [Boolean]
    viewport [string]
    inputVars [object]
    complete : [function]
    error : [function]
@return : none
```

```
//*********************************************
**********
FrameworkName.flow.loadPage (pgReference, args)
FrameworkName.flow.loadPage("somePage", {viewport :
'otherViewport' } );
    FrameworkName.flow.loadPage("somePage", {modal :
{closeButton : true} } );
```

In the above illustrated pseudo-code to start a flow, "(@params : flowName [string]" indicates the name of the flow reference to load; "args [object]" indicates that all arguments are optional; "modal [object]-closeButton [Boolean]" places a close button on the modal window; "viewport [string]" is used to load the flow into the specified viewport and may use default viewport specified in application options if none is specified; inputVars [object] specifies the name value pairs to be injected into the flow; "complete : [function]" is used to perform a callback when flow is finished; and "error : [function]" is used to perform a callback if the flow or a sub-flow thereof errors out. It shall be noted that the aforementioned pseudo-code for starting a flow is presented in a script language. In some other embodiments, a flow may be started via a list of one or more links (e.g., HTML links) on, for example, a dashboard or in the menu. Some illustrative HTML links may include the following:

```
<button data-loadpage="overviewPage"data-loadpage-
options="{viewport:'mainContentArea'}" >Load Overview Page</button>
    <button data-loadpage="overviewPage" data-loadpage-options="{ modal:
{closeButton : true} }" >Load Overview Page in Modal</button>
```

In the above illustrated pseudo-code, the first "<button data-loadpage= . . . " may be used to load, for example, the Overview page; and the second "<button data-loadpage= . . . " may be used to load, for example, the overview page in a modal view. In some embodiments, the "data-loadpage . . . " options may be optional. If the viewport is not specified, the client-side framework may use the viewport from which the even came as the default viewport. If the event did not arise from a viewport, the client-side framework may use the default viewport specified in Application Options which will be described in greater details below. In some other embodiments, a flow may be started from within another flow, rather than by using a script or a list of links as described above. In these embodiments, the flow may be considered as a sub-flow of the another flow.

The client-side framework 300 includes one or more controllers such as a flow controller 302, an action controller 306, and/or a view controller 310. The client-side framework 300 may execute a segment of one or more scripts (e.g., one or more JAVASCRIPT files) to call a method to start each of the one or more controllers. The client-side framework 300 may further optionally include one or more corresponding resolvers including a flow resolver 304 corresponding to the flow controller 302, an action resolver 308 corresponding to the action controller 306, and/or a view resolver 312 corresponding to the view controller 310. In some embodiments, a flow controller allows users to specify page to page navigation in their respective applications (e.g., an online tax return preparation software suite or an online financial management software suite, etc.).

A flow controller may also allow transitioning between views, actions, flows, or any combinations thereof. A resolver such as the flow resolver 304 aids the corresponding controller to resolve the references, rather than the hard-coded or actual path names or locations of some resources, the corresponding controller receives for a resource. The resolver may examine a mapping mechanism to determine the actual location of the resource, retrieve or obtain the actual implementation of the resource from the remotely located host computer (e.g., the host computer 118 of FIG. 1), and relay the actual implementation of the resource (e.g., the actual code for an instance of an object) to the flow controller. For example, the flow controller 302 may receive a reference rather than the actual pathname or location for a flow definition object. The corresponding flow resolver 304 may identify the reference received by the flow controller 302, examine a mapping mechanism to identify the actual location or pathname to the actual implementation of the flow definition object (e.g., the piece of code of the flow definition object in JAVASCRIPT Object Notation (JSON)) stored on a remotely located host computer (e.g., a Web server).

The flow resolver 304 may then retrieve or obtain the one or more flow configuration files 352 including the actual implementation (e.g., the one or more JSON files) from the remotely located host computer or browser cache if previously requested, and relay the retrieved or obtained actual implementation of the flow definition object to the flow controller 302. In the embodiments where the client-side framework includes a flow resolver 304, the flow controller 302 receives a reference to a flow configuration object or file, instead of the actual path or location of the flow configuration object or file, and the flow resolver 304 examines a mapping mechanism to identify the actual path or actual location to the requested flow configuration object or file. The flow resolver 304 may then identify and retrieve the actual implementation of the requested flow configuration file or object from the actual location situated on a remotely located host server and then transmit the identified or retrieved actual implementation to the flow controller.

In the case of an action controller 306, the corresponding action resolver 308, if included in the client-side framework 300, may identify a reference received by the action controller 306 to one or more scripts (e.g., one or more JAVASCRIPT files), examine a mapping mechanism to identify the actual locations or pathnames to the actual implementations of the one or more scripts (e.g., one or more pieces of code of the one or more scripts) stored on a remotely located host computer (e.g., a Web server). The action resolver 308 may then retrieve or obtain the one or more script resources 354 including the actual implementations (e.g., the code segments for the one or more scripts) from the remotely located host computer, or browser cache if previously requested, and relay the retrieved or obtained actual implementations of the one or more scripts to the action controller 306.

In the case of a view controller 310, the corresponding view resolver 312, if included in the client-side framework 300, may identify a reference received by the view controller 310 to one or more webpages (e.g., one or more HTML pages), examine a mapping mechanism to identify the actual locations or pathnames to the actual implementations of the one or more webpages (e.g., one or more pieces of code of the one or more webpages) stored on a remotely located host computer (e.g., a Web server). The view resolver 312 may then retrieve or obtain one or more view resources 356 including the actual implementations (e.g., the code segments for the one or more webpages) from the remotely located host computer or browser cache if previously requested and relay the retrieved or obtained actual implementations of the one or more webpages to the view controller 310.

Upon receiving the actual implementation of the flow configuration object or file 352, the flow controller 302 may correctly interpret the flow and reproduce a flow instance 314 by, for example, executing one or more directives from the flow configuration object or file 352. In the event that the flow instance 314 may include results from execution of an act, the flow instance 314 may further send a reference to the act to the action controller 306. In some embodiments where the client-side framework does not include an action resolver, the flow instance 314 may transmit the actual path or location to the act on a remotely located computing system to the action controller 306 so that the action controller 306 may identify and retrieve script source 354 including the actual implementation of the act at the provided path or location.

In some embodiments where the client-side framework includes an action resolver, the flow instance 314 may transmit a reference to the requested act, instead of the actual path or location to the act, on a remotely located computing system to the action controller 306 so that the action resolver 308 may identify and retrieve script source 354 including the actual implementation of the act at the provided path or location on the remotely located host computer. The action resolver 308 may then relay the retrieved script resource 354 to the action controller 306 which may then execute the script resource 354 and deliver the execution results to the flow instance 314 to identify results of execution of the act. In some embodiments where the flow instance 314 may need to display a view, the flow instance may pass a reference to, instead of the actual path or location of, the requested view to the view controller 310.

The view resolver 312 may then identify the actual path or location of the requested view resource by consulting a mapping mechanism and further to retrieve the requested view resource 356 including the actual implementation of the requested view resource 356 from a remotely located host computer. The view resolver 312 may then relay the retrieved view resource 356 to the flow instance 314 to fulfill the request. In some embodiments where the client-side framework does not include a view resolver, the flow instance 314 may pass the actual path or location of the requested view resource 356 to the view controller which is responsible for retrieving the requested view resource 356 from the remotely located host computing system.

The webpage 320 may identify user input 324 (e.g., mouse clicks, data value entries, etc.) and transmit the identified user input 324 to the client-side framework 300 and may also perform some processes on the user input 324 (e.g., validating, formatting, rendering, etc.) by using a view controller 310 to render the processed user input 324 in 320 or to set data for the user input 324. The webpage 320 may also identify the navigation information initiated by the user 322 and transmit the identified navigation information back to the view controller 310 in the client-side framework 300.

By way of example, the following pseudo-code represents an illustrated flow configuration file or object (e.g., the flow configuration file 352).

```
{
  metaData : { [ optional ]
  },
  require : [optional]
  {
    css : [ "path/to/css/file.css", "path/to/css/file2.css", ... ],
    js : [ path/to/css/file.js", "path/to/css/file2.js", ... ],
    modelDef : ["modelDef", "modelDef2", ... ]
  }
  models : [ optional ]
    }
      modelName : { [optional]
      className : <string>,
      modelDef : <string>
      daoName : <string >
    },
    { ... },
    { ... },
    ...
  ],
  onStart : { [ optional ]
    ref : <ref> [optional]
    params :
    exp :
    async :
  },
  onEnd : { [ optional ]
    ref : <ref> [optional]
    params :
    exp :
    async :
  },
  startState : <name>, // [ mandatory ]
```

-continued

```
  allowRandomAccess : <true | false>, - [optional ] defaults to true
    <flow state>: {
      history : <never | always | session >
      state_type: <VIEW | ACTION | FLOW | END>,
      ref: <string>, // reference to a VIEW, ACTION, or FLOW
      data : {n:v, n:v, ...}
      transitions :{
        <on> : <to>,
        <on> : <to>,
        etc...
      }
    },
    <flow state> : {
      .....
    }
}
```

The "metadata" option may include any metadata deemed important or desired. The "require : . . . " option is used to load any resources that may be needed before a flow starts. For example, the flow configuration file or object includes the "require" option to load the model definitions (via "modelDef"), the JAVASCRIPT files (via "js"), and the style sheet (via "css"). The resources may be loaded asynchronously before the flow starts so that the impact by network latency on communications between a client computing device and a remote host computing system may be reduced or completely eliminated. In addition, the client-side framework may use jQuery promises as return values from functions that perform asynchronous calls.

The "require" may also be called before loading models such that the model configuration or definition of a model may reside in memory before the model is created. The "models" option is used to automatically generate one or more models that the flow may need with the constructor arguments in the "modelNam" option and the name of the data access object (DAO) in the option "daoName". The "onStart" option is optional and is used to specify functionality to execute, an action or a reference to the action to call, or an expression to evaluate when the flow for which the flow configuration file or object is created starts. The "onEnd" option is also optional and is used to specify functionality to execute, an action or a reference to an action to call, or an expression to evaluate when the flow ends.

The "async" is used to declare that the onStart actions may be performed asynchronously. The "startState" option may be mandatory to start a flow with the specified flow node. The "allowRandomAccess" is an optional option and includes a binary value (e.g., "true" or "false" indicating whether or not the flow may be navigated via jump inside the flow. The optional option "models" indicates whether a model is to be automatically generated when the flow starts. In some embodiments, the client-side framework may generate a flow scope model every time a flow starts and then removes the flow scope model when the flow ends. The "modelDef" specifies the model definition that defines a particular model, and "daoName" option specifies the name of the Data Access Object (DAO) to use for the specified model.

The following pseudo-code represents an illustrated flow (a sub-flow in this example). In this illustrated flow, the client-side framework may load the flow referenced by "docs.subflow" (e.g., by using a flow resolver) and execute the flow. When the illustrated flow is done, the flow may return a number of responses. For example, if the illustrated flow returns "done", the client-side framework may transition to the flow node "endDone". If the illustrated flow returns "start", the client-side framework may transition to the "start" flow node.

```
"subflow" : {
    state_type" : "FLOW",
    "ref" : "does.subflow",
    "transitions" : {
        "done" : "endDone",
        "start" : "start"
    }
}
```

A view includes one or more screens that the user sees and interacts with on a website. The following pseudo-code represents an illustrated view where the view returns the response "goToActionMyThing", possibly resulting from a button click. The next flow node in the flow including the illustrated view may be a flow node with the name "'action_doMyThing'". In addition, if the view returns "startOver", the next flow node may be "start".

```
"pg1" : {
    "state_type" : "VIEW",
    "ref" : "docs.Page1",
    "transitions" : {
        "goToActionMyThing" : "action_doMyThing",
        "startOver" : "start"
    }
}
```

An action includes a script branching logic that determines which path to take in a flow and may return a variety of results. The following pseudo-code may be used to specify an action including a reference ("ref") to some resource named "ActionClass.doSomething". If this illustrated action returns the result "foo", the next flow node in the flow will be a node with the name "foo". If the illustrated action returns results other than "foo" as indicated by the wildcard "*", the flow will transition to the "start" node.

```
"action_doMyThing" : {
    "state_type" : "ACTION",
    "ref" : "ActionClass.doSomthing",
    "transitions" : {
        "foo" : "bar",
        "*" : "start"
    }
}
```

Figure 4:
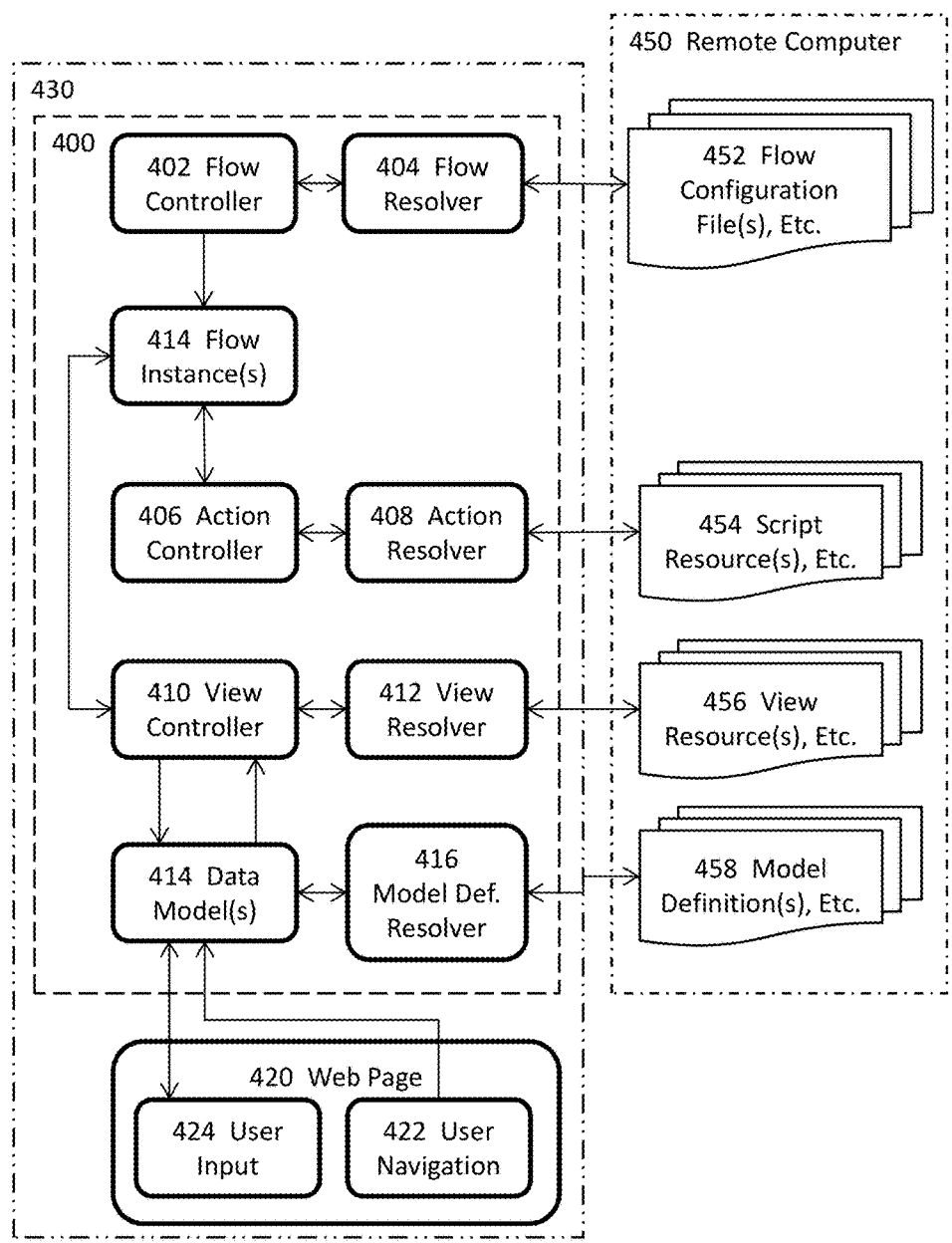
FIG. 4 illustrates another more detailed schematic flow diagram of a configuration-based client-side flow control framework for customizable user experience with additional controllers and resolvers in some embodiments.

FIG. 4 illustrates another more detailed schematic flow diagram of a configuration-based client-side flow control framework for customizable user experience with additional controllers and resolvers in some embodiments. FIG. 4 is substantially similar to FIG. 3 and illustrates a webpage 430 on a client computing device having some developer code (not shown and similar to the developer code 340 of FIG. 3) to load a flow (also not shown but similar to the flow 342 of FIG. 3). The webpage 430 also includes a client-side framework 400 that includes, as does FIG. 3, a flow controller 402 operatively yet optionally coupled a flow resolver 404 to retrieve one or more flow configuration files or objects 452 located on a remote computer 450 in order to reproduce one or more flow instances 414. The client-side framework 400 further includes the action controller 406 operatively yet optionally coupled to an action resolver 408 to retrieve one or more script resources 454 located on the remote computer 450 and a view controller 410 operatively yet optionally coupled to a view resolver 412 to identify and retrieve one or more view resources 456 from the remote computer 450.

The webpage also includes the webpage 420 having user input 424 and user navigation visible to users in substantially similar manners as those described for FIG. 3 above. The differences between FIG. 3 and FIG. 4 include one or more data models 414 which interact with the view controller 410 to load input definitions and may provide one or more model definitions or configurations to the view controller 410. In some embodiments where the client-side framework 400 includes a model definition resolver 416, the model definition resolver 416 may receive a reference to a model from data models 414, identify the actual path or location of the data model definitions or configurations for the reference by checking a mapping mechanism, and retrieve the model definition or configuration objects 458 including the actual implementation of the model at issue from the remote computer 450 at the identified path or location. Once the model definition or configuration resolver 416 retrieves the model definition object 458 located on the remotely located computing system 450, the model definition resolver 416 may transmit the model definition object 458 to the data models 414 to build the model at issue.

Figure 5:
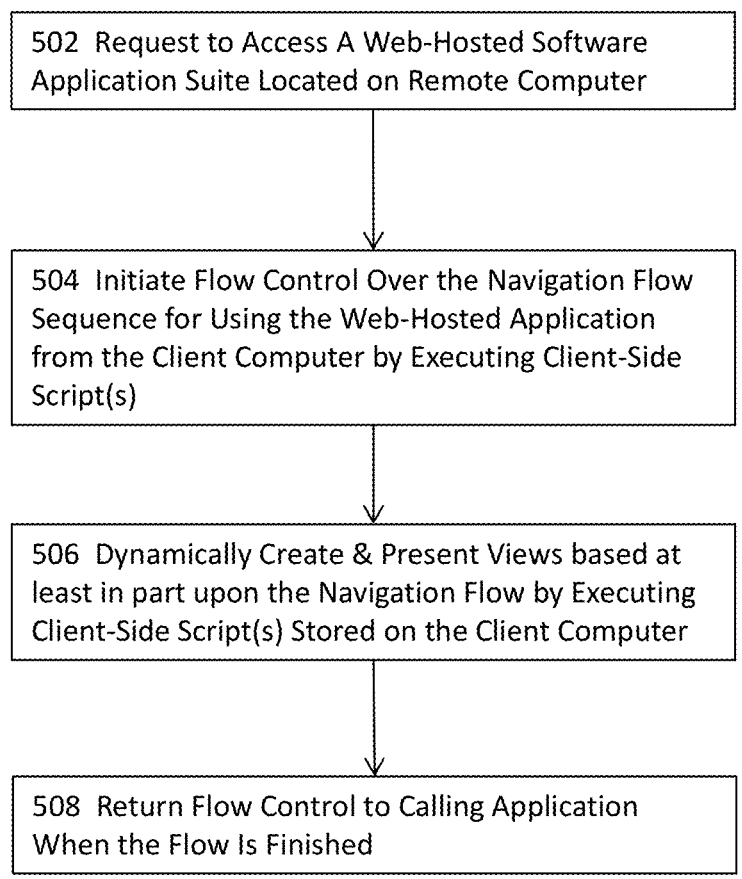
FIG. 5 illustrates a high level process flow diagram of a configuration-based client-side flow control framework for customizable user experience in some embodiments.

FIG. 5 illustrates a high level process flow diagram of a configuration-based client-side flow control framework for customizable user experience in some embodiments. More specifically, FIG. 5 illustrates a high level process flow diagram illustrating a client-side framework for flow control from the perspective of a client computing device, the process illustrated in FIG. 5 requests at 502 a to access a web-hosted software application suite (e.g., TURBOTAX tax return preparation application available from Intuit Inc., e.g., at turbottax.com) hosted on a remote computer. At 504, the process may then initiate flow control over the navigation flow sequence for using the web-hosted software application suite from the client computing device by executing one or more client-side scripts obtained from a remotely located host computer hosting the software application suite and stored on the client computing device.

For example, upon receiving a request to access a webpage controlling access to the software application suite hosted on a Web server, the process may execute some developer code stored as a part of the code for the webpage to load a flow customized by a developer for specific user experience with navigating through the application. The process may further cause the client computing device to execute a JAVASCRIPT file obtained from the Web server to initiate the client-side framework for controlling over the flow or the linked sequence of views that a user may experience in a browser window on the client computing device.

In the above example for 502, the client-side framework may execute a part of the JAVASCRIPT file to initialize a flow controller that reads a JSON flow configuration file stored on the Web server implement flow control as specified in the flow configuration file. In some of the illustrated embodiments, the process may initiate flow control based at least in part upon user's input. For example, the user may click a button or select an option that directs the flow to proceed from one flow node to another flow node. The process may dynamically reproduce and render one or more views in the browser window(s) based at least in part upon the flow by executing at least a part of the client-side script stored on the client computing device at 506. Once the flow ends, the process may return flow control to the calling application at 508.

Figure 6:
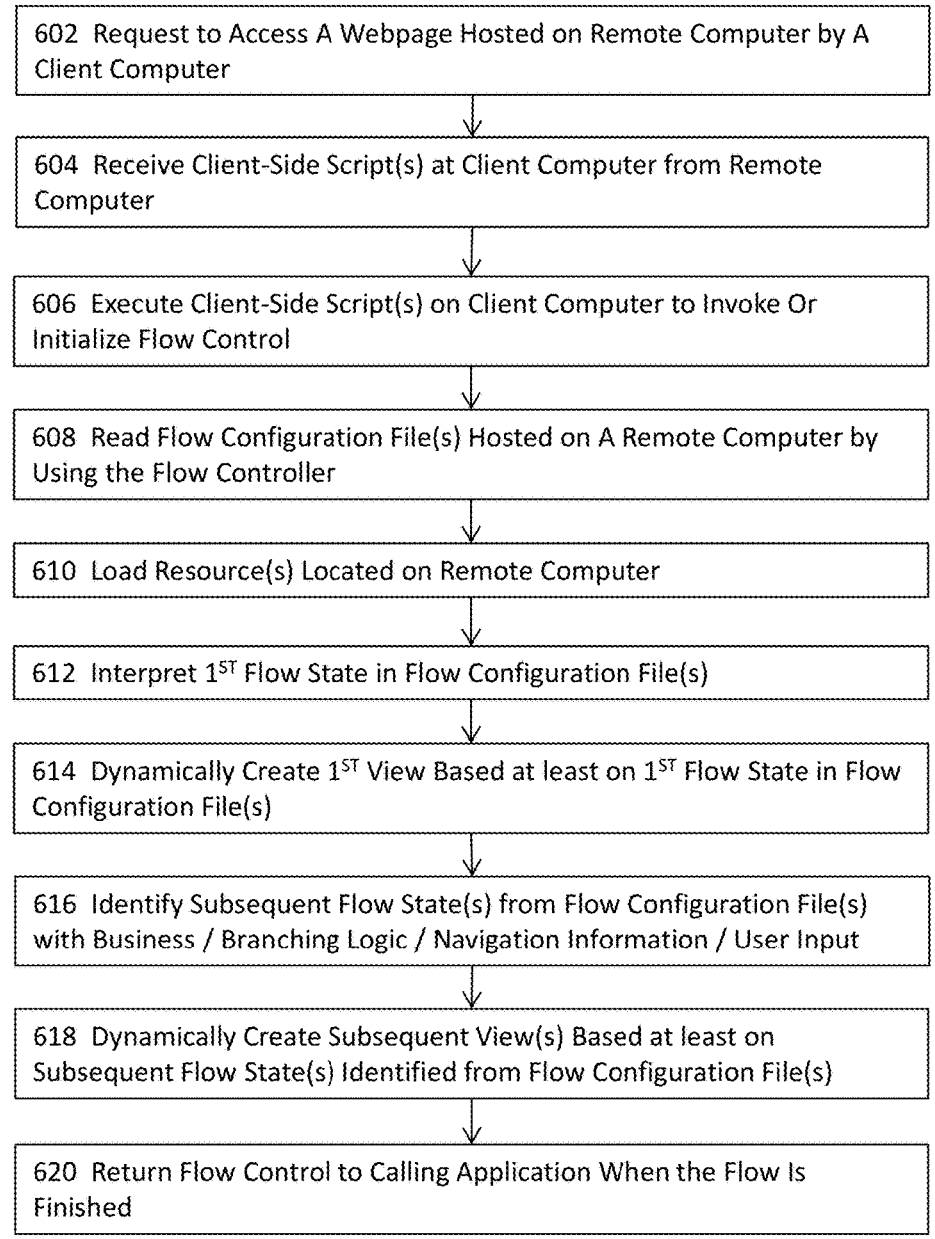
FIG. 6 illustrates a more detailed process flow diagram of a configuration-based client-side flow control framework for customizable user experience in some embodiments.

FIG. 6 illustrates a more detailed process flow diagram of a configuration-based client-side flow control framework for customizable user experience in some embodiments. The process may request to access a webpage hosted on a remotely located host computer at 602. The process may cause the requesting client computing device to retrieve and store one or more client-side scripts on the client computing device at 604. The one or more client-side scripts may be used to initialize the client-side framework residing on the client computing device to control the flow of navigating through various flow nodes or flow states in the webpage. In some embodiments, the one or more client-side scripts include JAVASCRIPT files that are programmed by the developer of the webpages for the application suites users attempt to access and are initially stored on a computing system (e.g., a Web server hosting the application suite to which the user attempts to access) remote from the client computing devices of the users.

These one or more script files or objects are transmitted from the remote computing system to a client computing device when a user attempts to access the main webpage of an application suite to which the user attempts to access. For example, the one or more script files or objects may be transmitted from a Web server hosting the website the user accesses to the memory allocated for the browser on the user's computing device in some embodiments. The client computing device may then execute the one or more client-side scripts currently stored on the client computing device at 606 to set up the client-side framework in order to invoke and initialize the flow control that the developer of the webpage desires for users to experience in a customizable manner. The client-side framework then read one or more flow configuration files or objects stored on the remotely computing system at 608.

In some embodiments, the client-side framework residing on the client computing device invoke a flow controller to read the one or more flow configuration files which include the configurations or definitions of elements of the flow. It shall be noted that the terms "definition" and "configuration" are used interchangeably throughout this application, unless other specifically noted to the contrary. An illustrative flow configuration file or object is provided above in the description for FIG. 3. In these embodiments, the client's browser receives and executes one or more script files or objects from a remote computer to set up the client-side framework on the on the user's computing device. The client-side framework residing on the user's computing device then invokes a process (e.g., a flow controller) to identify and read one or more flow configuration files or objects to reproduce the flow that the developer of the website has programmed and customized for users to experience.

The client-side framework may then load resources that may be required or desired to guide the user through the flow customized by the developer at 610. The resources may include flows, sub-flows, actions, or views, each of which has been described in the previous sections describing FIGS. 1-4. These resources are not statically, dynamically, or automatically loaded from when a webpage is loaded or is being loaded or when a user attempts to access a webpage in order to reach the application suite that the user attempts to use on the developer's computing system. Rather, the client-side framework interprets the flow by referencing one or more flow configuration files stored on a host computing system (e.g., a Web server) remote from a user's computing device and loads the at least some of these resources stored on the host computing system as needed.

For example, the flow may progress to a specific flow node that needs to present a certain screen to a user at a given point during navigation. Upon interpreting the flow, the client-side framework may then load the resources needed for the flow node from the remote host computing device to reproduce the screen for presentation to users. Moreover, by loading a resource, the client-side framework identifies the resource from the remote host computer and retrieves the actual implementation of the resource from the remote host computer. In some embodiments, the flow may include a reference, instead of the actual pathname or location for the resource and transmit the reference to the client-side framework.

The flow may include the actual pathname or location of a resource on the remote host computing system and transmit the actual pathname or location to the client-side framework so the client-side framework may identify and retrieve the resource with the actual pathname or location. In other words, the resource to be loaded may be identified in the flow and to the client-side framework either via a reference or via an actual pathname or location on the remote host computing system. Moreover, by loading a resource, the client-side framework retrieves the actual implementation of the resource. For example, the client-side framework may retrieve the actual code of an instance of a flow configuration file or object or a part thereof for a flow, the actual code of an HTML page for a view, or the actual code of a script file for an action. The client-side framework may also obtain client-side model instances needed by a flow state or execute functionalities by interpreting and executing one or more client-side scripts, etc.

Once the resources are loaded at 610, the client-side framework may then identify the initial or first flow node in the flow by referencing one or more flow configuration files at 612. Depending on whether the client-side framework includes a resolver, the client-side framework may further receive references or actual pathnames or locations to various resources needed for reproducing the first flow node. At 614, the client-side framework may then retrieve these various resources from the remote host computing system to dynamically reproduce a first view for the first or initial flow node in the flow based at least in part upon the one or more flow configuration files or objects.

The client-side framework may identify one or more subsequent flow nodes in the flow by further referencing the one or more flow configuration files at 616 and then dynamically reproduce one or more views for the one or more identified subsequent flow nodes at 618 based at least in part upon the one or more subsequent flow states identified from the one or more flow configuration files or objects. In reproducing these one or more subsequent views, the client-side framework may also receive references to or actual pathnames or locations of resources and may retrieve the actual implementations of these resources from the remote host computing system for the reproduction of these one or more subsequent views. When the flow is finished, the client-side framework may return, at 620, flow control to the calling application such as an application on the website to which the user attempts to access.

Figure 7A:
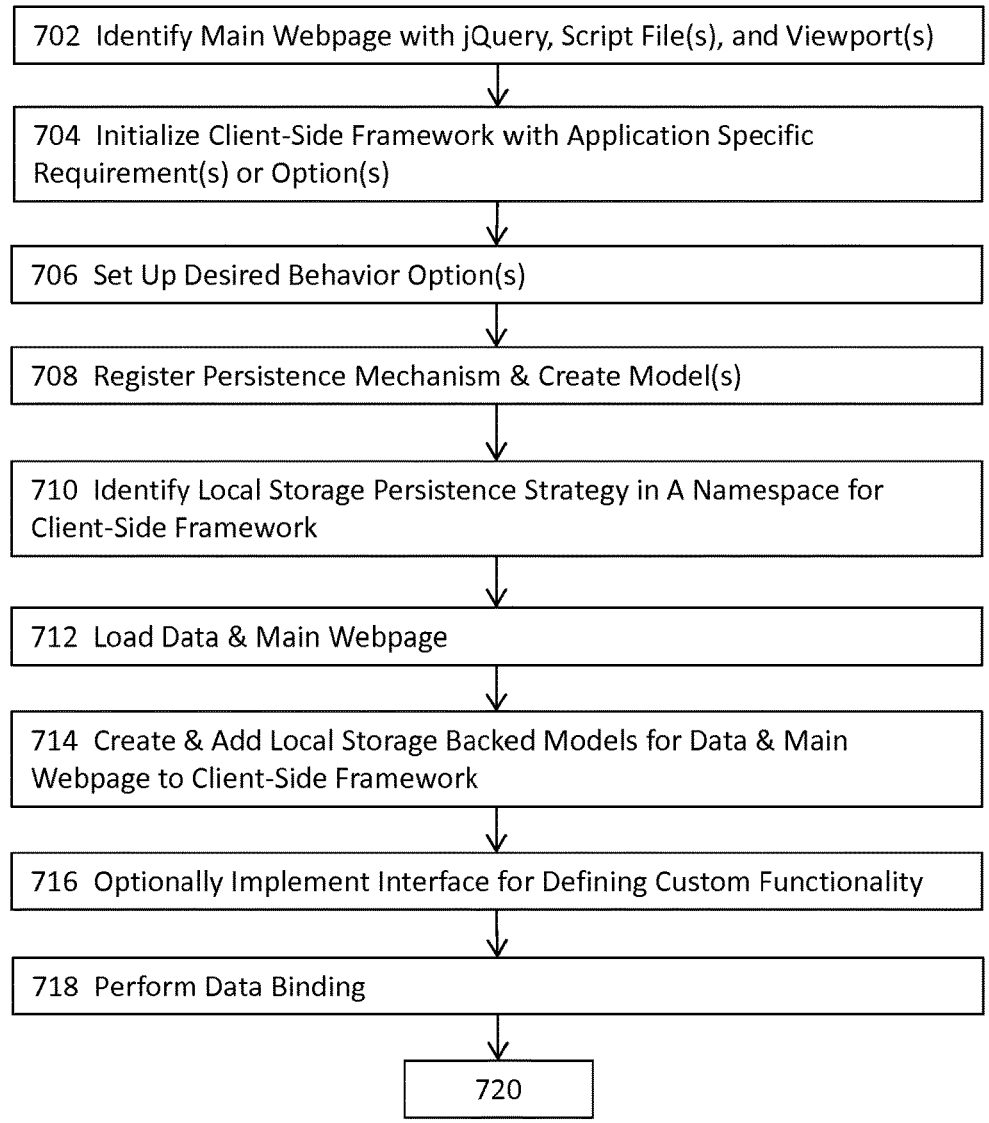
FIGS. 7A-7B illustrate another more detailed process flow diagram of a configuration-based client-side flow control framework for customizable user experience in some embodiments.
Figure 7B:
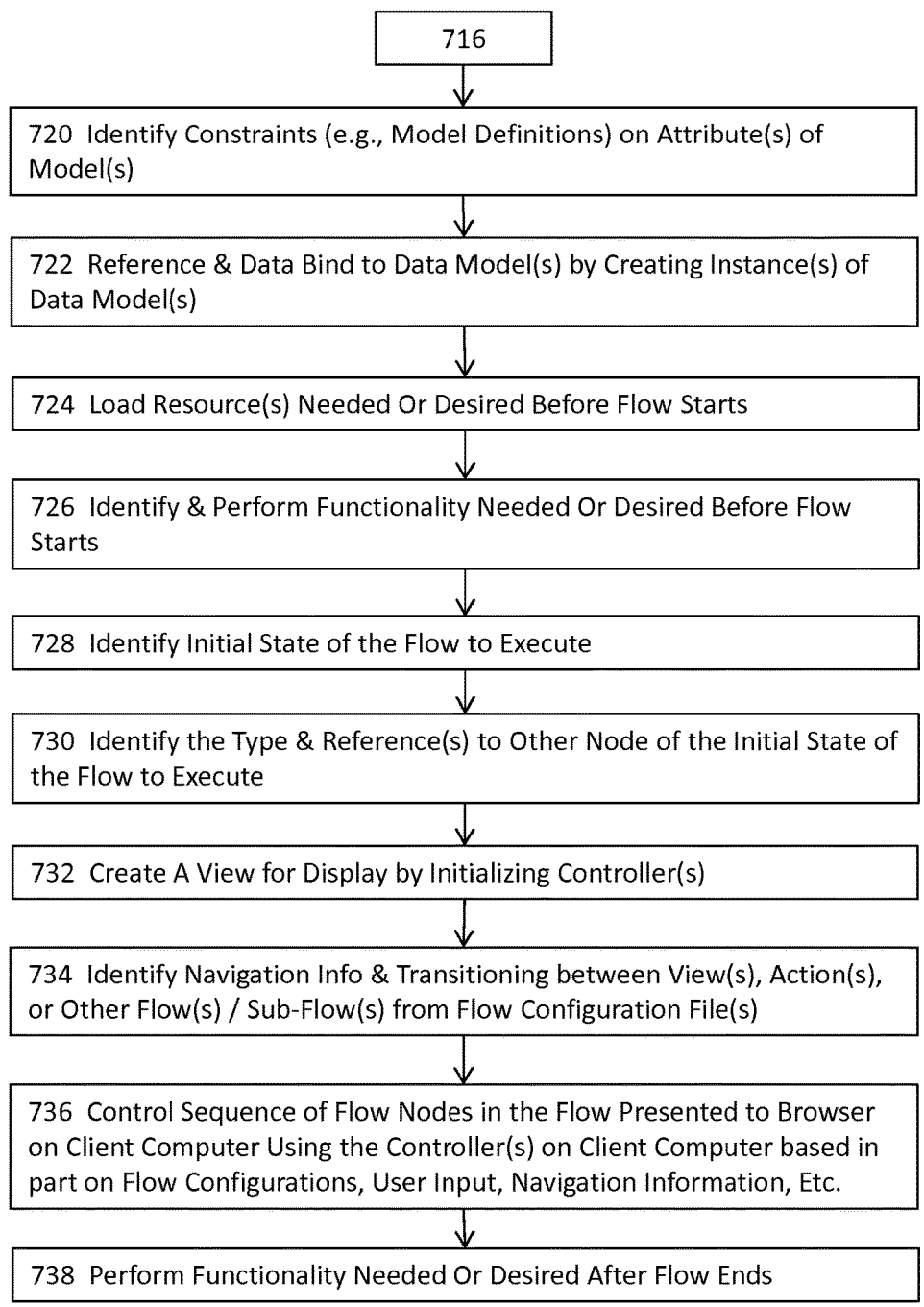

FIGS. 7A-7B illustrate another more detailed process flow diagram of a configuration-based client-side flow control framework for customizable user experience in some embodiments. The process flow first identifies, at 702, the main webpage including the jQuery, one or more JAVASCRIPT files or objects, and one or more viewports in which screens are displayed for asynchronous programming to reduce or completely eliminate the impact by network latency on communications between a client computing device and a remote host computing system. At 704, the process flow may initialize the client-side framework with one or more application specific requirements or options. More details about application specific requirements or options are described below with reference to FIG. 8. The process flow may further set up the desired behavior of the client-side framework at 706. The desired behavior may be set up all at once in some embodiments. The following pseudo-code may be used to set up some desired behavior all at once.

```
Client-Side_Framework.init ({
   appId : "Client-Side_FrameworkDemo",
   defaultViewport : "content_area",
   ABTestConfig : abtestConfig,         // preloaded JAVASCRIPT file with the
abtestConfig variable set
   viewResolverOptions : viewResolverConfig,   // preloaded JAVASCRTPT file with
the viewResolverConfig variable set
   flowResolverOptions : flowResolverConfig,   // preloaded JAVASCRIPT file with
the flowRcsolverConfig variable set
   actionRcsolverOptions : actionExecutorConfig,  // preloaded JAVASCRIPT file with
the actionExecutorConfig variable set
   modelDefOptions : modelDefinitionConfig,     //preloaded JAVASCRIPT file with
the modelDefinitionConflg variable set
   validationOptions : {
      tooltipPosition : 'right', // position of tooltip relative to input. supported values: 'top',
'bottom', 'right'
      hideOnFocus : true, // hide the tooltip when input field gets focus
      showOnlyOne : true, // show only one error tooltip
      showMultipleErrorsPerInput : false, // if there is more than one error, show them all
      vaintateOnBack : false, // No validation if the customer hits back
      validateOnJump : false, // No validation if the customer jumps in navigation
      useValidator : true // use the validation functionality of the client-side framework
   },
   enableTraceConsole : true, // Set up the debugging console
   alertOnMojoExceptions : [Framcwork.log.CRITICAL, Framework.log.ERROR,
Framework.log.DEPRECATED]
});
```

The desired behavior may also be set up individually in some other embodiments. The following pseudo-code may be used to set up some desired behavior of the client-side framework individually.
Framework.options.setOption("alertOnMojoExceptions", false);
Framework.options.setOption("viewPortId", "otherContent Area");
Framework.options.setOption("validationOptions", {tooltipPosition: 'top'});

At 708, the process flow may register one or more local storage persistence strategies to be used in reproducing one or more models. The process flow may identify the local storage persistence mechanism in one or more namespaces for the client-side framework at 710. For example, the process flow may identify and register a name of Data Access Object as a local storage persistence strategy. By way of example, the following pseudo-code may be used to register a local storage persistence strategy and to identify the local storage persistence strategy in a namespace for the client-side framework—"Framework".

```
jQuery(document).ready(function ( ) {
   var appOptions = {
      ...
   };
   Framework.init(appOptions);
   // Load a local storage persistence strategy in the client-side
framework namespace so models may use it
   Framework.data.registerDAO("localStorage", new Frame-
work.data.localStorageDAO( ));
   // Create a local storage backed model and add it to the client-side
framework,
   // when done loading call the _fireItUp method to start the controller
   Framework.data.addModels([
      {"modelName" : "Demo_Model", "daoName" : "localStorage"},
      {"modelName" : "memory_Model"}
   ]);
});
```

At 712, the process flow may load data and the main webpage for the application hosted on a remote host computing system. By way of example, the following pseudo-code may be used to load data in some embodiments.

```
jQuery(document).ready(function ( ) {
   var appOptions = {
      ...
   };
   Framework.init(appOptions);
   // Load a local storage persistence strategy in the Framework
   namespace so models may use the local storage persistence strategy
   Framework.data.registerDAO("localStorage", new Framework.data.local-
StorageDAO( ));
   // Create a local storage backed model and add the local storage
   backed model to the client-side framework,
// when done loading, call the _fireItUp method to start the controller
   Framework.data.addModels([
      {"modelName" : "Demo_Model", "daoName" : "localStorage"},
      {"modelName": "memory_Model"}
   ]);
   Framework.dataloadData({
      success : function ( )
      ...
      },
      error : function ( ) {
         ...
      }
   });
});
```

The process flow may create and add local storage backed models for data and the main page to the client-side framework at 714. The following pseudo-code may be used to load the main webpage or the first webpage for the application to which the user attempts to access.

```
jQuery(document).ready(function ( ) {
  var appOptions = {
    ...
  };
  Framework.init(appOptions);
// Load a local storage persistence strategy in the client-side
framework "Framework" namespace so models may use the
local storage persistence strategy
Framework.data.registerDAO("localStorage", new Mojo.data.local-
StorageDAO( ));
// Create a local storage backed model and add the local storage
backed model to the client-side framework "Framework"
// when done loading, call the _fireItUp method to start the controller
  Framework.data.addModels([
{"modelName" : "Demo_Model", "daoName" : "localStorage"},
    {"modelName": "memory_Model"}
  ]);
  Framework.dataloadData({
    success : function ( )
      Framework.getSome('mainFlow');
    },
    error : function ( ) {
      ...
    }
});
```

The process flow may further optionally implement an interface (e.g., a user interface) for defining one or more custom functionalities at 716 and perform data binding to bind the user interface elements to other data at 718 to simplify the development of applications including a user interface. For example, the process flow may bind the user interface elements to one or more application data models with the MVVM (Model-View, View-Model) pattern. The process flow may further perform input binding by using one or more attributes or tags specific to the client-side framework. In some of these embodiments, a bound control comprises a widget or HTML input element whose value is tied or bound to a field in a data model such that changes made to data within the control may be automatically saved to the data model when the control's "valueCommit" or blur event triggers. A blur even may include an event the occurrence of which causes a field in a data model to lose focus.

For example, a blur event for an input field expecting an area code of a phone number may trigger as soon as or shortly after a three-digit number is entered into the field. The occurrence of the illustrated blur event may cause the current field to lose focus and the data model to proceed to, for example, the next field or a navigation button (e.g., "Next" or "OK"). In these embodiments, the client-side framework may use data binding so that a piece of data changed in a view may be automatically updated in the corresponding data model. Various approaches may perform the input binding by adding a tag or attribute "data-bind" to the element to be bound. An illustrative format of the data-bind attribute or tag may include "<model namespace 'dot'<model field name>", for example. The model namespace may be dot delimited. The following illustrates some pseudo-code for input binding by way of examples.

```
<input data-bind="MyModel.myValue" />
<input data-bind="my.model.namespace.myValue" />
```

The above illustrative pseudo-code may bind the input of the specified field to the data model having the name "MyModel" and the field "myValue". If the value of MyModel.myValue is changed by any other entity, the changes may be reflected in the specified input field. Data binding may be applied to any input element on a page including, for example but not limited to, input field(s), radio button(s), checkbox(es), select list(s), etc. By way of example, the following pseudo-code with comments following double forward slashes may be used for these purposes.

```
<input type="radio" name="radioGroup" value="Framework" data-
bind="MyModel.myRadioValue" />
<input type="radio" name="radioGroup" value="ROCKS" data-
bind="MyModel.myRadioValue" /> // (may set the 'value' of the
selected radio button in the model)
<input type="checkbox" data-bind="MyModel.myCheckBox-
Value" /> // (may set Boolean true or false in the model)
  <select data-bind="MyModel/mySelectValue"> <option/> .... //
(may set the value of the selected option in the model)
```

The input binding may include options including "defaultValues", "dataBindEvent", "bindFunction", "silent", "force", "trim", etc. More specifically, "defaultValues" may be used to set the default value of a data model by specifying the default value as a string or a reference to another data model's value. The "dataBindEvent" option may be used to specify which DOM events may trigger a data change event on the corresponding input element. The "bindFunction" option may be used to execute a function as a result of the value of the data model changing, and parameters passed to a function may include the data value and the jQuery wrapped element that the input element is bound to. The "silent" option may be used to update the model without broadcasting or populating the change. The "force" option may be used to set data in the data model, even if the data model is marked as read only in its corresponding model definition. The "trim" option may trim any leading and trailing whitespace from a value before the client-side framework inserts the value into a data model.

The process flow may also perform text binding, text binding to functions, automatic formatting for text, or binding data on navigation or the flow at 718. The dynamic text binding may be used to dynamically bind text elements to a data model so that when the data model is changed, the text element may also reflect the value of the data model. Dynamic text binding may be done with the following illustrative pseudo-code: <h1> Welcome ${MyModel.firstName}</h1>. In the alternative, a text element may also be dynamically bound using the data-bind attribute on the element so that when the data model is changed, the text element may also reflect the value of the data model. This may be done with the following pseudo-code: <span data-bind="MyModel.lastName"></span>. Text binding to a function may be used to resolve the value of text when some complex logic that cannot simply be determined by a value in a data model. In text binding to a function, the functionality may be passed off to a function by using the following illustrative pseudo-code:

<span> Welcome @ {figureOutMyTextFunction( )}</span>
Or pass parameters:
<span> Welcome @{figureOutMyTextFunction(${model.value} )}</span>

The functionality may also be added inline by using the following pseudo-code: Welcome @{$ {model.age}<18 ? "Mr" : "Sir"} $ {model.lastName}. Binding data on navigation may set a value in a data model when navigating through a flow by using the "data-set" attribute or tag on any HTML element. The value of this "data-set" attribute or tag includes an object that includes a list of data models and values. Binding data on navigation may be used to, for example, set data in a data model when, for example, a button is clicked. The following pseudo-code may be used to bind data on navigation:

```
<button data-nav="next" data-set="{'myModel.buttonVal':
'Continue'}">Continue</button>
<button data-nav="next" data-set="{'myModel.buttonVal': 'Continue',
'myModel.finished' : true}">Continue</button>
```

The process flow may identify one or more constraints of one or more attributes or tags on one or more data models at 720 by using model definitions. It shall be noted that the terms "attribute" and "tag" may be used interchangeably in this application, unless otherwise recited or claimed to the contrary. A model definition includes a script that describes one or more constraints on an attribute of a data model, although the use of model definitions may be optional in the client-side framework. A model definition may be a model definition object by itself or may be included in one of the one or more client-side script files that are transmitted from a remote host computer to a client computing device for setting up the client-side framework. By way of example, the following pseudo-code with inline comments following double forward slashes may be used to specify the properties of a model definition object:

```
MyApp.modelDefs.sample = {
metaData : { // describe constraints at the model level
version : <int>
mutable : <Boolean>, // specify whether elements may be dynamically
added to this model definition
groupId: <array>, // client-side framework may group data models that
are based on this groupId for iterating. This option may be used for
multiple copy functionality
},
modelElement : {
 defaultValue: <value> // value to be auto-assigned to this element;
syntax is $[model.property] if it is to default to another models value
or just a string value otherwise,
validate: <array> // list of validators to be applied to this element,
format: <string> // formatter to be applied to this element with
type: <STRING | BOOLEAN | NUMBER | DATE | COLLECTION>,
accessibility : <string> // reader text for the element
placeholderText : <string> // default text showing in HTML5
compliant browsers
mapping : <descriptions> // Description of how this element is
mapped to persistent storage
 },
 ....
}
```

The following pseudo-code may be used to specify a contact information model definition:

```
MyApp.modelDefs.ContactInfo = {
    "email" : {
       "defaultValue": "",
       "validate": ["email", "minLength(3)", "maxLength(256)"]
    },
    "phone" : {
       "defaultValue": "",
       "validate":["required", "phone"],
       "format": "phone"
    },
    "streetAddr":{
       "defaultValue":null,
       "type":"string"
    }
}
```

The following pseudo-code may be used to specify a user model definition:

```
MyApp.modelDefs.User = {
    "firstName":{
       "defaultValue":"",
       "validate":["required"],
       "format":null,
       "type":"string",
       "onchange":null
    },
    "lastName":{
       "validate":["required"],
       "type":"string"
    },
    "birthday": {
       "validate":["required", "date('MM/DD/YYYY')", before('today')"],
       "format":"date('MM/DD/YYYY')",
       "type":"string"
    },
    "SSN":{
       "validate":["required", "ssn(true)"],
       "format":"ssn(true)",
       "type":"string"
    }
}
```

The process flow may further reference one or more data models and bind data to the one or more referenced data models by reproducing one or more instances of the one or more data models at 722. A data model in the client-side framework includes an actual instance of a class in the paradigm of object oriented programming. For example, a data model may include an actual instance of a JAVASCRIPT class. The class encapsulates all the functionality needed for managing the lifecycle of data. A software application may include one or more instances of a data model, each representing a discrete set of information. An instance of a data model may be created before referencing and performing data binding to this data model. The client-side framework may automatically register a created data model that may be accessed by the name of the data model. A data model may be created in a variety of different ways. For example, a data model may be created in JAVASCRIPT software program. By way of example, the following pseudo-code may be used to create a data model.

```
Framework.data.addModel( modelName, options )
    modelName : [String] // or instance of Framework.data.Model
    options : [object] {
       className:      // string that is the class of the model to create -
                       defaults to "Framework.data.Model"
       daoName:    // name of DAO (your persistence strategy)
       groupId: // name of a group to associate this model with (can be an
                array)
       modelDef: // reference to the JSON model definition (or the JSON
                object itself)
       allowInvalidDataInModel : Boolean // if false, the data model may
             not accept data that does not pass validation. Validation may be
             performed against the array of validators specified in the model
             definition.
    }
```

Multiple data models may be added by passing an array of argument objects to addModels( ) by using the following illustrative pseudo code.

```
    Framework.data.addModels( [args, args, ..., args ] );
args : [object] {
    modelName : [String] // String or instance of Mojo.data.Model
```

```
className:      // string that is the class of the model to create -
   defaults to "Framework.data.Model"
daoName:        // name of DAO (your persistence strategy)
groupId:        // name of a group to associate this model with (can be
   an array)
modelDef:       // reference to the JSON model definition (or the JSON
   object itself)
allowInvalidDataInModel : Boolean // if false, the data model may not
   accept data that does not pass validation. Validation is performed
   against the array of validators specified in the model definition.
}
```

Once a data model is created, the client-side framework may perform various functionalities to the data model. The following pseudo-code illustrates some application programming interfaces (APIs) that a client-side framework may provide. The first set of pseudo-code with inline notes following double forward slashes may be used to set data as shown below.

```
Framework.data.setDataVal( "modelName", "key", value, options ) // Set
data in a model //
Framework.data.setDataInCollection ( "modelName", "key", index, val,
options ) // set data in a model that is an array or object //
Where options are: {
silent    [Boolean] - to specify that event should not be sent (default =
false)
force     [Boolean] - to set the data even if it's readOnly (default = false)
trim      [Boolean] - remove leading and trailing whitespace from the
value before setting in the model
}
```

The following pseudo-code with inline notes following double forward slashes may be used to obtain data in a data model: Framework.data.getDataVal ("modelName", "key"), where Framework is the name of the client-side framework.

The following pseudo-code with inline notes enclosed within double forward slashes may be used to perform other illustrative functionalities.

```
Framework.data.removeModel ( "modelName" ) // Remove the model
from the system //
Framework.data.getModel ( "modelName" ) // Get a handle to the actual
Mojo.data.Model instance //
Framework.data.getModelNamesinSystem ( ) // Get a list of model names
in the system //
Framework.data.addModelToGroup ( "modelName", "groupName" ) //
Add a model to a group //
Framework.data.removeModelFromGroup ( "modelName", "groupName"
) // Remove a model to a group //
Framework.data.addAttributeToModel ( "modelName", "attributeName",
value ) // Add an attribute to a model //
   Framework.data.getModelAttribute ( "modelName", "attributeName"
) // Get the value of an attribute on a model //
```

In some embodiments, the client-side framework may be configured to provide additional functionalities by sub-classing the data.Model class. By way of example, sub-classing the data.Model class provided in the illustrative client-side framework may be done via the following pseudo-code.

```
FrameworkIsntGoodEnoughModel = Framework.data.Model.extend({
      myNewMethod : function ( ) { .... },
      // @Override
      init : function ( ) { // add any initialization logic here },
      // @Override
      getName : function ( ) { //return "name" }
   })
```

The client-side framework may load one or more resources that are needed or desired before a flow starts at 724. In some embodiments, this may be achieved by using the "onStart" attribute explained above. The client-side framework may then identify and perform one or more functionalities that are needed or desired before flow starts at 726. In some embodiments, this may be achieved by using the "onEnd" attribute explained above. The client-side framework may identify an initial flow node or a first flow node to execute at 728. In some embodiments, identification of an initial flow node or a first flow node may be achieved via "startState" described in the flow configuration above. The client-side framework may also identify the type and one or more references to one or more other flow nodes following the initial flow node of the flow to execute at 730.

The client-side framework may reproduce a view for displaying to the user at 732. In some embodiments, the client-side framework may invoke a view controller and optionally a view resolver to retrieve the actual implementation of one or more required or desired resources to reproduce the view. At 734, the client-side framework may identify navigation information, branching logic, transitioning logic, or business logic to transition between one or more views, one or more actions, one or more other flows, or any combinations thereof based at least in part upon one or more flow configuration files. The client-side framework may control the sequence of flow nodes in the flow presented to the user's browser on the client computing device by using one or more controllers residing on the client computing device based at least in part upon one or more flow configuration files, user input, or navigation information, etc. at 736. The details about controlling the sequence of flow nodes are described in the above description for the flow configuration with reference to FIG. 3. At 738, the client-side framework may perform one or more functionalities required or desired after the current flow ends. In some embodiments, this may be achieved by using the "onEnd" segment of code in the flow configuration file for the current flow as described above. The process flow may then load resources needed or desired before a flow starts FIG. 8 illustrates some illustrative application global options in some embodiments. The application global options may be specified to configure the behavior of the client-side framework. If a specific application global option is not specified, the client-side framework may apply its default setting(s) to this specific application global option.

"appId" may be required and may receive a string for the identification of the application. The client-side framework will use the default setting in the "data-framework-app" attribute in the body of the HTML tag if the "appId" is not supplied. "defaultViewport" may be required and may receive the name of a DOM (Domain Object Model) element in the portion of a webpage visible to users. This option represents where the views will be displayed. The client-side framework will use the first DOM element with the "data-viewport" attribute in the HTML if the "defaultViewport" is not supplied.

"ABTestConfig" may be optional and may receive the A/B test configuration file(s). A default A/B test configuration file may be set as the default in some embodiments. In some other embodiments, this option may not have a default setting. "viewResolveOptions" may be optional and may receive the object (e.g., a view resolver) describing how to resolve view references. "flowResolverOptions" may be optional and may receive the object describing how to resolve flow references. "actionResolverOptions" may be optional and may receive the object describing how to resolve action references.

"validationOptions" may be optional and may be implemented as shown in the illustrative pseudo-code with inline notes below.

```
validationOptions : {
        useValidator : true [OPTIONAL] // Use the validation function-
ality of the client-side framework //
        tooltipPosition : 'top' [OPTIONAL] // Position of tooltip relative
to input. supported values: 'top', 'bottom', 'right' //
        hideOnFocus : false [OPTIONAL] // Hide the tooltip when input
field gets focus //
        showOnlyOne : false [OPTIONAL] // Show only one error tooltip
//
        showMultipleErrorsPerInput : false [OPTIONAL] // If there is
more
than one error, show all the errors //
        suppressErrors : false [OPTIONAL] // Validate and return the
result, but do not show any error messages //
        validateOnBack : false [OPTIONAL] // No validation if the
customer hits back //
        validateOnJump : false [OPTIONAL] // No validation if the
customer jumps in navigation //
    },
```

"formatOptions" may be optional and may be implemented as shown in the illustrative pseudo-code with inline notes below.

```
        useFormatter : true [OPTIONAL] // Use the auto-formatting
functionality of the client-side framework //
        formatEvent : ["keyup", "blur", "paste"],
        ignoreKeyCodes : [ ], // whether formatter is to ignore certain
keystrokes //
        formatOnLoad : false [OPTIONAL] // format the element when
the page is bound //
    },
```

"setFocusOnFirstInput" may be implemented in the following syntax with inline notes: setFocusOnFirstInput : true [OPTIONAL] // Set focus on the first input element of a page when it renders //. "showTransitionMsg" may be implemented in the following syntax with inline notes: showTransitionMsg : false [OPTIONAL] // Show a message between view transitions //. "transitionMsg" may be implemented in the following syntax with inline notes: transitionMsg : "Processing . . . " [OPTIONAL] // Message to show between view transitions //.

"defaultModelClass" may be implemented in the following syntax with inline notes: defaultModelClass : "Framework.data.dataModel" [OPTIONAL] // Default model class to use to create models defined in flow definitions. Where "Framework" represents the name of the client-side framework. "autoCreateModels" may be implemented in the following syntax with inline notes: autoCreateModels : true [OPTIONAL] // Create models if models are referenced; if the value of this option is false, the application may enforce the creation of models explicitly before using the models //. "defaultTextForNullModelValue" may be implemented in the following syntax with inline notes: defaultTextForNullModelValue : " " [OPTIONAL] // Value to return when requesting a model value that has not been set yet //.

"dataBindEvent" may be implemented in the following syntax with inline notes: dataBindEvent : ["keyup". "blur" ] [OPTIONAL] // what DOM events to listen to on input elements to cause a model update. May include an array or a string //. "enableTraceConsole" may be implemented in the following syntax with inline notes: enableTraceConsole : true [OPTIONAL] // Set up the debugging console //. "alertOnMojoExceptions" may be implemented in the following syntax with inline notes: alertOnMojoExceptions : [Boolean || Array] // Boolean OR array of client-side framework exception types (true means ALL exceptions including INFO) //.

"attributeBindingList" may be implemented in the following syntax with inline notes: attributeBindingList : ['class', 'style'. 'value'. 'src', 'href', 'alt', 'data-visible', 'data-disabled', 'data-src'] // List of HTML attributes that Mojo will look for bindings //. "dontBindTextInNodeList" may be implemented in the following syntax with inline notes: dontBindTextInNodeList : ['script', 'code'] // List of HTML nodes that Mojo will NOT perform text binding on //. "visibilityFunction" may be implemented in the following syntax with inline notes: visibilityFunction : null [OPTIONAL] // a function to call to hide/show the element. Parameters passed to your transition function are the jQuery wrapped DOM element and a Boolean for show. (will be true for show, false for hide) //.

"disabledFunction" may be implemented in the following syntax with inline notes: disabledFunction : null [OPTIONAL] // a function to call to make and element disabled if the client-side framework's default functionality is not desired. Parameters passed to the disabled function include the jQuery wrapped DOM element and a Boolean for disabled. (will be true for make disabled, false otherwise) //.

Figure 9:
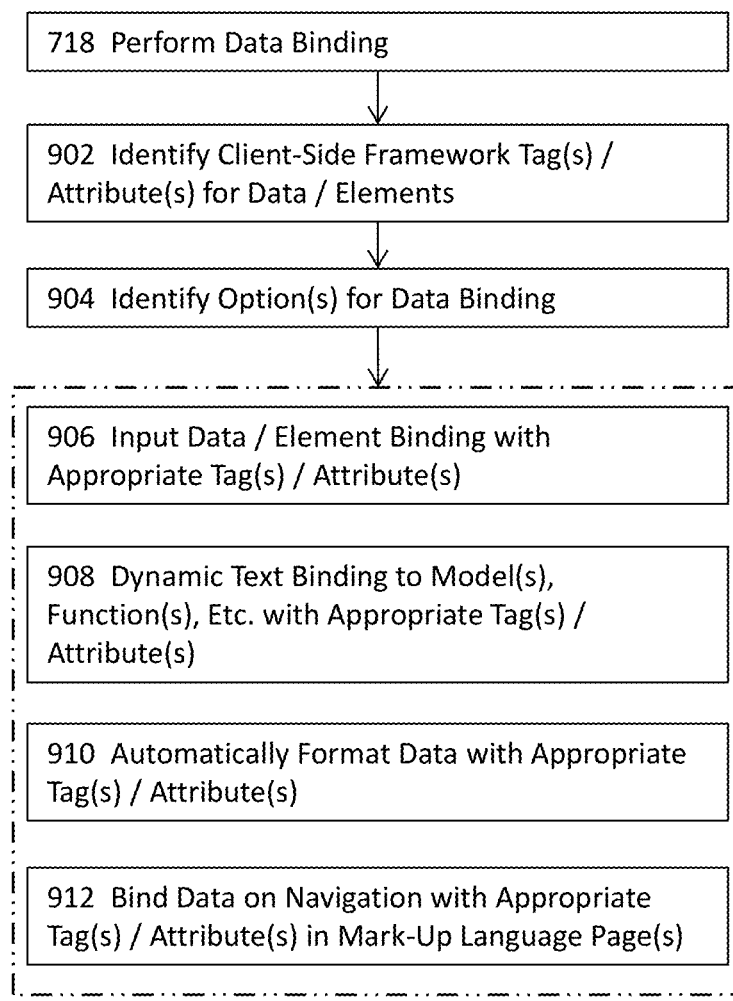
FIG. 9 illustrates a more detailed process flow diagram of a part of the flow diagram illustrated in FIG. 7 for a configuration-based client-side flow control framework for customizable user experience in some embodiments.

FIG. 9 illustrates a more detailed process flow diagram of a part of the flow diagram illustrated in FIG. 7 for a configuration-based client-side flow control framework for customizable user experience in some embodiments. More specifically, FIG. 7 illustrates more details about data binding presented in FIG. 7. In the illustrated data binding process flow 718, the client-side framework may identify one or more client-side framework tags or attributes for data or one or more elements at 902. The client-side framework may further identify one or more options for data binding. The one or more options may include, for example but not limited to, "defaultValues", "dataBindEvent", "bindFunction", "silent", "force", "trim", etc.

More specifically, "defaultValues" may be used to set the default value of a data model by specifying the default value as a string or a reference to another data model's value. The "dataBindEvent" option may be used to specify which DOM events may trigger a data change event on the corresponding input element. The "bindFunction" option may be used to execute a function as a result of the value of the data model changing, and parameters passed to a function may include the data value and the jQuery wrapped element that the input element is bound to. The "silent" option may be used to update the model without broadcasting or populating the change. The "force" option may be used to set data in the data model, even if the data model is marked as read only in its corresponding model definition. The "trim" option may trim any leading and trailing whitespace from a value before the client-side framework inserts the value into a data model.

The client-side framework may perform data binding to bind input data and one or more elements of a user interface at 906. The following illustrates some pseudo-code for input binding by way of examples.

```
        <input data-bind="MyModelmyValue" />
        <input data-bind="my.model.namespace.myValue" />
```

The above illustrative pseudo-code may bind the input of the specified field to the data model having the name "MyModel" and the field "myValue". If the value of MyModel.myValue is changed by any other entity, the changes may be reflected in the specified input field. Data binding may be applied to any input element on a page including, for example but not limited to, input field(s), radio button(s), checkbox(es), select list(s), etc. By way of example, the following pseudo-code with comments following double forward slashes may be used for these purposes.

```
<input type="radio" name="radioGroup" value="Framework" data-
     bind="MyModel.myRadioValue" />
<input type="radio" name="radioGroup" value="ROCKS" data-
     bind="MyModel.myRadioValue" /> // (may set the 'value' of the
selected radio button in the model)
   <input type="checkbox" data-bind="MyModel.myCheckBoxValue" /> //
     (may set Boolean true or false in the model)
   <select data-bind="MyModel.mySelectValue" > <option/> .... // (may set
     the value of the selected option in the model)
```

The client-side framework may perform dynamic text binding to one or more data models, one or more functions, etc. with one or more appropriate tags or attributes at 908. The dynamic text binding may be used to dynamically bind text elements to a data model so that when the data model is changed, the text element may also reflect the value of the data model. Dynamic text binding may be done with the following illustrative pseudo-code: <h1> Welcome $ {MyModel.firstName}</h1>. In the alternative, a text element may also be dynamically bound using the data-bind attribute on the element so that when the data model is changed, the text element may also reflect the value of the data model. This may be done with the following pseudo-code: <span data-bind="MyModel.lastName"></span>. Text binding to a function may be used to resolve the value of text when some complex logic that cannot simply be determined by a value in a data model. In text binding to a function, the functionality may be passed off to a function by using the following illustrative pseudo-code:

```
<span> Welcome @{ figureOutMyTextFunction( )} </span>
Or pass parameters:
<span> Welcome @{ figureOutMyTextFunction( ${model.value} )
}</span>
```

The functionality may also be added inline by using the following pseudo-code: Welcome @{$(model.age)<18 ? "Mr": "Sir") ${model.lastName}. The client-side framework may automatically format data with one or more appropriate tags or attributes at 910. This may be achieved by "useFormatter" option described above. The client-side framework may bind data on navigation with one or more appropriate tags or attributes in the markup language web-pages. Binding data on navigation may be used to, for example, set data in a data model when, for example, a button is clicked. The following pseudo-code may be used to bind data on navigation:

```
<button data-nav="next" data-set="{'myModel.buttonVal':
'Continue'}">Continue</button>
   <button data-nav="next" data-set="{'myModel.buttonVal': 'Continue',
'myModel.finished' : true}">Continue</button>
```

Figure 10:
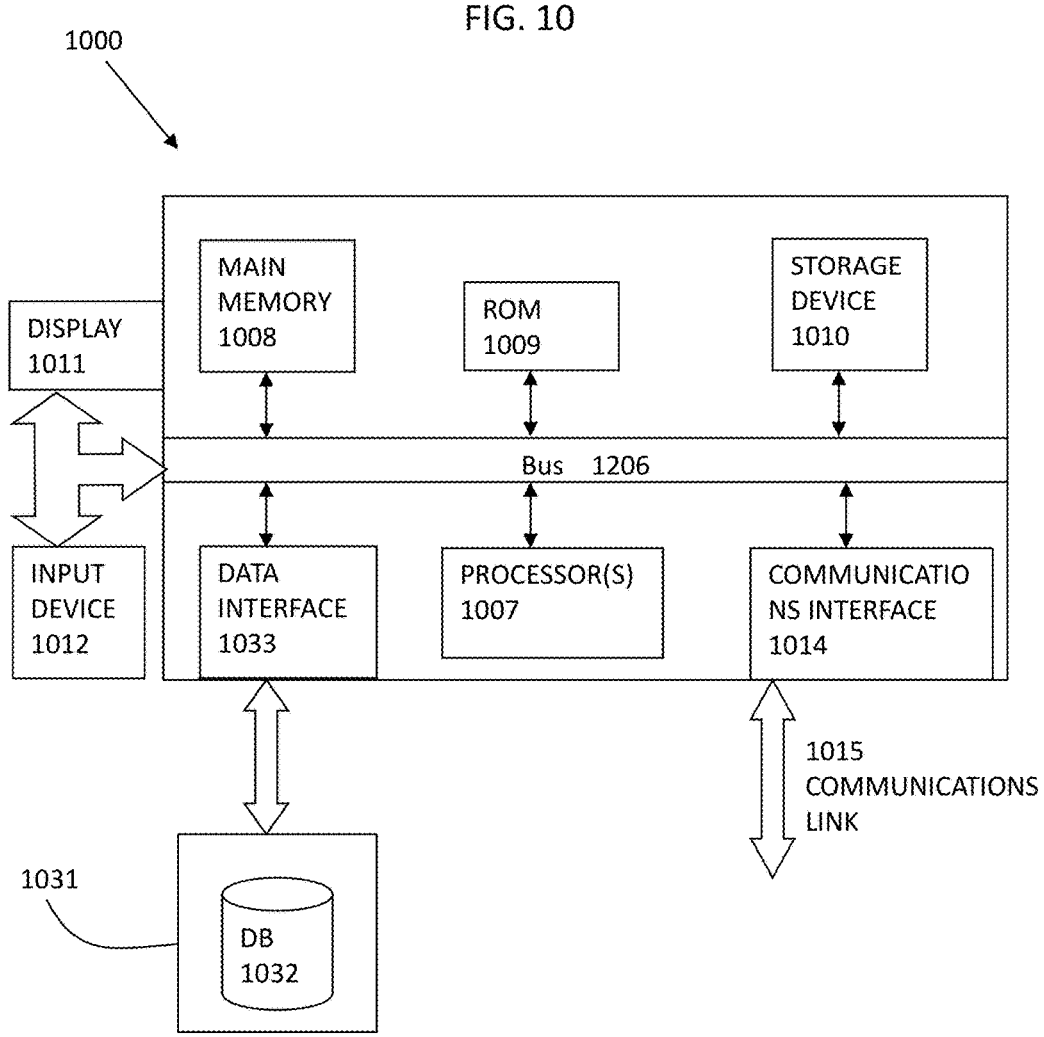
FIG. 10 illustrates a block diagram of an illustrative computing system suitable for implementing various embodiments described herein.

FIG. 10 illustrates a block diagram of components of an illustrative computing system 1000 suitable for implementing various embodiment of the invention. For example, the exemplary computing system 1000 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment of the invention, computer system 1000 performs specific operations by one or more processors or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1007 may be used to perform various actions such as various actions, processes, or modules involving determining, analyzing, performing actions, etc. In some embodiments, at least one of the one or more processors or processor cores 1007 has the multithreading capability.

In one embodiment, the term "logic" shall mean any combination of software or hardware that is used to implement all or part of the invention. In the single embodiment or in some embodiments, the one or more processors or processor cores 1007 may be used to perform various acts such as various acts involving determining, analyzing, performing actions, etc. In some embodiments, at least one of the one or more processors or processor cores 1007 has the multithreading capability to execute a plurality of threads to perform various tasks as described in the preceding sections.

Various actions as described in the preceding paragraphs may be performed by using one or more processors, one or more processor cores, or combination thereof 1007. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 933, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. It shall also be noted that although various examples described or drawings illustrated herein refer to a merchant's pairing a connected device (e.g., a cellular phone) with a wireless peripheral (e.g., a wireless transaction card reader), various aspects described apply with full and equal effects to any users who are pairing their connected devices to various types of wireless peripherals. Therefore, the reference to a merchant or a wireless transaction card reader are not intended to and shall not be interpreted as limiting the scope of the application or the scope of the claims, unless otherwise specifically recited or claimed. Accordingly, embodiments are intended to exemplify alternatives, modifications, and equivalents that may fall within the scope of the claims.

What is claimed is:

1. A machine implemented method for implementing a configuration-based client-side flow control framework residing on a client computing device for customizable user experience, the method being performed by at least the client computing device and comprising:
    the client computing device requesting to access a remotely hosted software application located on a remote host computer at least by transmitting a request to the remote host computer;
    the client computing device initializing a client-side framework residing on the client computing device and comprising one or more flow modules that determines and adds a plurality of flow nodes into a customizable flow sequence in a customizable order for presentation to a display viewport of the client computing device for customizing page navigation of the remotely hosted software application, the client-side framework initialized at least by executing one or more client-side scripts that are transmitted, in response to the request, from the remote host computer to the client computing device;
    determining, at a flow resolver module in the client-side framework, one or more locations for one or more resources on the remote host computer for rendering contents of a webpage for accessing the remotely hosted software application;
    asynchronously retrieving, at the client-side framework, one or more actual implementations of the one or more resources from the remote host computer or from a remote computing resource accessible by the remote host computer via a computer network element based at least in part upon the one or more locations; and
    the client-side framework on the client computing device executing the customizable flow sequence for rendering at least a webpage view for accessing the remotely hosted software application based at least in part upon the flow sequence and the one or more actual implementations at least by executing the one or more client side scripts that are transmitted to the client computing device from the remote host computer in response to the request; wherein the client-side framework:
    identifies an initial flow state in the flow sequence by interpreting one or more flow configuration files located on the remote host computer,
    identifies a subsequent flow state immediately following the initial flow state in the flow sequence by interpreting the one or more flow configuration files located on the remote host computer,
    reproduces an initial view for the initial flow state by using the resource located on the remote host computer, and
    reproduces a subsequent view immediately following the initial view for the subsequent flow state by using the resource located on the remote host computer.

2. The machine implemented method of claim 1, further comprising the client computing device:
    receiving the one or more client-side scripts from the remote host computer;
    executing the one or more client-side scripts residing on the client computing device to initialize a client-side framework; and the client-side framework residing on the client computing device identifying and interpreting one or more flow configuration files residing on the remote host computer.

3. The machine implemented method of claim 1, further comprising the client-side framework
- receiving a reference to, rather than a location or a path name of, an actual location of a resource of the one or more resources needed for reproducing at least some of the contents of the webpage view;
- identifying, at the flow resolver module, the actual location of the resource on a non-transitory computer readable storage medium accessible by the remote host computer based at least in part upon the reference; and
- retrieving an actual implementation of the resource for the webpage view from the actual location on the remote host computer.

4. The machine implemented method of claim 3, further comprising the client-side framework reproducing the webpage view by using the actual implementation of the resource.

5. The machine implemented method of claim 4, wherein
- the actual implementation of the resource includes programming code for the resource, and the resource includes a view, a flow, or an action,
- the webpage view includes one or more screens presented to a browser window on the client computing device for viewing or interaction,
- the action includes a script branching logic determining a path to traverse in the flow sequence, and
- the flow includes one or more sub-flows each having one or more flow states corresponding to the flow sequence.

6. The machine implemented method of claim 1, further comprising the client computing device
- identifying a main webpage for accessing the remotely hosted software application, wherein the main webpage includes jQuery, one or more script files, and one or more viewports;
- initializing the client-side framework with one or more application options;
- the client-side framework registering one or more local storage persistence mechanisms; and
- creating one or more data models by using at least the one or more local storage persistence mechanisms.

7. The machine implemented method of claim 1, further comprising the client-side framework performing data binding for the flow sequence.

8. The machine implemented method of claim 7, the client-side framework performing data binding further comprising the client-side framework
- identifying one or more client-side framework attributes for the data binding; and
- identifying one or more data binding options for the data binding.

9. The machine implemented method of claim 7, the client-side framework performing data binding further comprising the client-side framework
- performing input binding to bind one or more user interface elements to input data;
- performing dynamic text binding to bind one or more text elements to a data model;
- performing text-function binding to bind one or more text elements to a function; and
- performing navigation binding to bind navigation related information to one or more data models.

10. The machine implemented method of claim 1, further comprising the client-side framework
- loading one or more resources before the flow sequence starts;
- performing one or more functions before the flow sequence starts; and
- performing one or more additional functions after the flow sequence ends.

11. A system for implementing a configuration-based client side flow control framework residing on a client computing device for customizable user experience, the system comprising:
- a client computing device that comprises at least a processor, a browser installed thereupon, and non-transitory memory allocated for the browser and is configured at least to:
- request to access a remotely hosted software application located on a remote host computer at least by transmitting a request to the remote host computer,
- initialize a client-side framework residing on the client computing device and comprising one or more flow modules that determines and adds a plurality of flow nodes into a customizable flow sequence in a customizable order for presentation to a display viewport of the client computing device for customizing page navigation of the remotely hosted software application, the client-side framework initialized at least by executing one or more client-side scripts that are transmitted, in response to the request, from the remote host computer to the client computing device;
- determine, at a flow resolver module in the client-side framework, one or more locations for one or more resources on the remote host computer for rendering contents of a webpage for accessing the remotely hosted software application;
- asynchronously retrieve, at the client-side framework, one or more actual implementations of the one or more resources from the remote host computer or from a remote computing resource accessible by the remote host computer via a computer network element based at least in part upon the one or more locations; and
- the client-side framework on the client computing device is configured to execute the customizable flow sequence for rendering at least a webpage view for accessing the remotely hosted software application based at least in part upon the flow sequence and the one or more actual implementations at least by executing the one or more client-side scripts that are transmitted to the client computing device from the remote host computer in response to the request; wherein the client-side framework:
- identifies an initial flow state in the flow sequence by interpreting one or more flow configuration files located on the remote host computer,
- identifies a subsequent flow state immediately following the initial flow state in the flow sequence by interpreting the one or more flow configuration files located on the remote host computer,
- reproduces an initial view for the initial flow state by using the resource located on the remote host computer, and
- reproduces a subsequent view immediately following the initial view for the subsequent flow state by using the resource located on the remote host computer.

12. The system of claim 11, wherein the client computing device is further configured to: receive the one or more client-side scripts from the remote host computer; execute the one or more client-side scripts residing on the client computing device to initialize a client-side framework; and identify and interpret one or more flow configuration files residing on the remote host computer by using the client-side framework.

13. The system of claim 11, wherein the client-side framework residing on the client computing device is further configured to: receive a reference to, rather than a location or a path name of, a resource of the one or more resources needed for reproducing the webpage view; identify an actual location of the resource on the remote host computer based at least in part upon the reference to the resource; and retrieve actual implementation of the resource for the webpage view from the actual location on the remote host computer.

14. The system of claim 11, wherein the client computing device is further configured to: identify a main webpage for accessing the remotely hosted software application, wherein the main webpage includes jQuery, one or more script files, and one or more viewports; initialize the client-side framework with one or more application options; register one or more local storage persistence mechanisms by using at least the client-side framework; and reproduce one or more data models by using at least the one or more local storage persistence mechanisms by using at least the client-side framework.

15. The system of claim 11, wherein the client computing device is further to: perform data binding for the flow sequence.

16. A computer program product comprising a non-transitory machine readable storage medium having stored thereupon a sequence of instructions which, when executed by a connected device, causes the connected device to perform a process for implementing a configuration-based client-side flow control framework residing on a client computing device for customizable user experience, the process being performed by at least the client computing device and comprising:
   requesting to access a remotely hosted software application located on a remote host computer at least by transmitting a request to the remote host computer;
   initializing a client-side framework residing on the client computing device and comprising one or more flow modules that determines and adds a plurality of flow nodes into a customizable flow sequence in a customizable order for presentation to a display viewport of the client computing device for customizing page navigation of the remotely hosted software application, the client-side framework initialized at least by executing one or more client-side scripts that are transmitted, in response to the request, from the remote host computer to the client computing device;
   determining, at a flow resolver module in the client-side framework, one or more locations for one or more resources on the remote host computer for rendering contents of a webpage for accessing the remotely hosted software application; and
   asynchronously retrieving, at the client-side framework, one or more actual implementations of the one or more resources from the remote host computer or from a remote computing resource accessible by the remote host computer via a computer network element based at least in part upon the one or more locations; and
   the client-side framework on the client computing device executing the customizable flow sequence for rendering at least a webpage view for accessing the remotely hosted software application based at least in part upon the flow sequence and the one or more actual implementations at least by executing the one or more client side scripts that are transmitted to the client computing device from the remote host computer in response to the request; wherein the client-side framework:
   identifies an initial flow state in the flow sequence by interpreting one or more flow configuration files located on the remote host computer,
   identifies a subsequent flow state immediately following the initial flow state in the flow sequence by interpreting the one or more flow configuration files located on the remote host computer,
   reproduces an initial view for the initial flow state by using the resource located on the remote host computer, and
   reproduces a subsequent view immediately following the initial view for the subsequent flow state by using the resource located on the remote host computer.

17. The computer program product of claim 16, the process further comprising receiving the one or more client-side scripts from the remote host computer; executing the one or more client-side scripts residing on the client computing device to initialize a client-side framework; and identifying and interpreting one or more flow configuration flies residing on the remote host computer.

18. The computer program product of claim 16, the process further comprising: receiving a reference to, rather than a location or a path name of, a resource of the one or more resources needed for reproducing the webpage view; the client side framework residing on the client computing device identifying an actual location of the resource on the remote host computer based at least in part upon the reference to the resource; and retrieving actual implementation of the resource for the webpage view from the actual location on the remote host computer.

19. The computer program product of claim 16, the process further comprising: reproducing the webpage view by using the actual implementation of the resource.

20. The computer program product of claim 16, the process further comprising: identifying an initial flow state in the flow sequence by interpreting one or more flow configuration tiles located on the remote host computer; identifying a subsequent flow state immediately following the initial flow state in the flow sequence by interpreting the one or more flow configuration files located on the remote host computer; reproducing an initial view for the initial flow state by using the resource located on the remote host computer; and reproducing a subsequent view immediately following the initial view for the subsequent flow state by using the resource located on the remote host computer.

21. The computer program product of claim 16, the process further comprising: identifying a main webpage for accessing the remotely hosted software application, wherein the main webpage includes jQuery, one or more script files, and one or more viewports; initializing the client-side framework with one or more application options; registering one or more local storage persistence mechanisms; and reproducing one or more data models by using at least the one or more local storage persistence mechanisms.

22. The computer program product of claim 16, the process further comprising performing data binding for the flow sequence.

23. The computer program product of claim 22, the process further comprising: identifying one or more client-side framework attributes for the data binding; and identifying one or more data binding options for the data binding.

24. The computer program product of claim 22, the process further comprising: performing input binding to bind one or more user interface elements to input data;

performing dynamic text binding to bind one or more text elements to a data model; performing text-function binding to bind one or more text elements to a function; and performing navigation binding to bind navigation related information to one or more data models.

25. A machine implemented method for implementing a configuration-based client-side flow control framework residing on a client computing device for customizable user experience, the method being performed by at least the client computing device and comprising:

the client computing device requesting to access a remotely hosted software application located on a remote host computer at least by transmitting a request to the remote host computer;

the client computing device initializing client-side framework comprising one or more flow modules that determines a plurality of flow nodes into a customizable flow sequence in a customizable order for presentation to a display viewport of the client computing device for customizing page navigation of the remotely hosted software application, the client-side framework initialized at least at least by executing one or more client-side scripts that are transmitted, in response to the request, from the remote host computer to the client computing device;

determining, at a flow resolver module in the client-side framework stored at least partially in memory of the client computing device, one or more resources one or more locations for one or more resources on the remote host computer for rendering contents of a webpage for accessing the remotely hosted software application; and asynchronously retrieving, at the client-side framework, one or more actual implementations of the one or more one or more resources via a computer network element based at least in part upon the one or more locations; and the client-side framework on the client computing device rendering at least a webpage view for accessing the remotely hosted software application based at least in part upon the flow sequence and the one or more actual implementations, the client side framework stored on the client computing device rendering the webpage view further comprising:

the client-side framework identifying and interpreting one or more flow configuration files residing on the remote host computer;

the client-side framework identifying a reference to, rather than a location or a path name of, a resource of the one or more resources needed for reproducing at least some of the contents for the webpage view; and the client-side framework identifying, at the flow resolver module, an actual location of the resource on a non-transitory computer readable storage medium accessible by the remote host computer based at least in part upon the reference and retrieving an actual implementation of the resource for the webpage view from the actual location; wherein the client-side framework:

identifies an initial flow state in the flow sequence by interpreting one or more flow configuration files located on the remote host computer, identifies a subsequent flow state immediately following the initial flow state in the flow sequence by interpreting the one or more flow configuration files located on the remote host computer, reproduces an initial view for the initial flow state by using the resource located on the remote host computer, and reproduces a subsequent view immediately following the initial view for the subsequent flow state by using the resource located on the remote host computer.

* * * * *